US011502887B2

(12) United States Patent
Pan et al.

(10) Patent No.: US 11,502,887 B2
(45) Date of Patent: Nov. 15, 2022

(54) METHOD AND APPARATUS FOR COLLISION MITIGATION AND COMPLEXITY REDUCTION FOR NOMA

(71) Applicant: IDAC HOLDINGS, INC., Wilmington, DE (US)

(72) Inventors: Kyle Jung-Lin Pan, Saint James, NY (US); Oghenekome Oteri, San Diego, CA (US); Loic Canonne-Velasquez, Dorval (CA); Fengjun Xi, San Diego, CA (US); Afshin Haghighat, Ile-Bizard (CA); Prasanna Herath Mudiyanselage, Saint-Laurent (CA); Chunxuan Ye, San Diego, CA (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/045,100

(22) PCT Filed: Apr. 4, 2019

(86) PCT No.: PCT/US2019/025845
§ 371 (c)(1),
(2) Date: Oct. 2, 2020

(87) PCT Pub. No.: WO2019/195585
PCT Pub. Date: Oct. 10, 2019

(65) Prior Publication Data
US 2021/0152409 A1 May 20, 2021

Related U.S. Application Data

(60) Provisional application No. 62/652,781, filed on Apr. 4, 2018.

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0048* (2013.01); *H04L 5/0053* (2013.01);
(Continued)

(58) Field of Classification Search
CPC ............ H04L 27/2605; H04L 27/2613; H04L 5/0016; H04L 5/0048; H04L 5/0053;
(Continued)

(56) References Cited

U.S. PATENT DOCUMENTS

2008/0080472 A1   4/2008   Bertrand et al.
2014/0233528 A1   8/2014   Webb et al.
(Continued)

OTHER PUBLICATIONS

Motorola ("Scheduling Request Mechanism for EUTRA Uplink"; 3GPP TSG RAN1#51; Jeju, Korea; Nov. 5-9, 2007; R1-074599) (Year: 2007).*

(Continued)

*Primary Examiner* — Melvin C Marcelo
*Assistant Examiner* — Natali Pascual Peguero
(74) *Attorney, Agent, or Firm* — Volpe Koenig

(57) ABSTRACT

A method and apparatus for performing autonomous transmission for performing collision mitigation and complexity reduction for non-orthogonal multiple access (NOMA) transmissions are disclosed. A wireless transmit/receive unit (WTRU) may receive a configuration with multiple SRs and associated preamble subsets, randomly select a preamble subset and select a SR configuration according to the randomly selected preamble subset based on the received configuration. The WTRU may transmit an SR associated with the selected preamble subset. Next the WTRU may select a preamble from the selected preamble subset, and transmit the selected preamble with a data transmission. Each SR associated with preamble subsets may be distin- (Continued)

guished by time and frequency resources, sequence index value, or PUCCH index value.

8 Claims, 17 Drawing Sheets

(51) Int. Cl.
*H04W 72/14* (2009.01)
*H04W 74/08* (2009.01)

(52) U.S. Cl.
CPC ......... *H04L 27/2605* (2013.01); *H04W 72/14* (2013.01); *H04W 74/0833* (2013.01)

(58) Field of Classification Search
CPC ..... H04L 5/008; H04L 5/0091; H04L 5/0032; H04W 72/14; H04W 74/08; H04W 74/0833
See application file for complete search history.

(56) References Cited

U.S. PATENT DOCUMENTS

| | | | |
|---|---|---|---|
| 2018/0063869 A1 | 3/2018 | Zhang et al. | |
| 2018/0152950 A1* | 5/2018 | Xiong | H04W 72/0446 |
| 2020/0059935 A1* | 2/2020 | Qian | H04W 72/042 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Considerations On Non-Orthogonal Multiple Access Operations," 3GPP TSG RAN WG1 Meeting 92, R1-1802636, Athens, Greece (Feb. 26-Mar. 2, 2018).
Interdigital Inc., "Considerations On Procedures Related to Non-orthogonal Multiple Access," 3GPP TSG RAN WG1 Meeting 92, R1-1802635, Athens, Greece (Feb. 26-Mar. 2, 2018).
Interdigital Inc., "Discussion on Procedures Related to Non-Orthogonal Multiple Access," 3GPP TSG RAN WG1 Meeting #95, R1-1813213, Spokane, USA (Nov. 12-16, 2018).
Interdigital Inc., "On Collision Mitigation and Handling for Non-orthogonal Multiple Access," 3GPP TSG RAN WG1 Meeting #93, R1-1807029, Busan, South Korea (May 21-25, 2018).
Interdigital Inc., "On Demodulation Reference Signal for Non-orthogonal Multiple Access," 3GPP TSG RAN WG1 Meeting #93, R1-1807030, Busan, South Korea (May 21-25, 2018).
Interdigital Inc., "On NOMA Related Procedures in NR," 3GPP TSG RAN WG1 Meeting #94, R1-1809080, Gothenburg, Sweden (Aug. 20-24, 2018).
Interdigital Inc., "On Non-orthogonal Multiple Access Procedures," 3GPP TSG RAN WG1 Meeting #94bis, R1-1811197, Chengdu, China (Oct. 8-12, 2018).
Interdigital Inc., "On Operations for Non-Orthogonal Multiple Access," 3GPP TSG RAN WG1 Meeting #92bis, R1-1804864, Sanya, China (Apr. 16-20, 2018).
Interdigital Inc., "On Operations of Non-Orthogonal Multiple Access," 3GPP TSG RAN WG1 Meeting #93, R1-1807028, Busan, South Korea (May 21-25, 2018).
Interdigital Inc., "On Procedures for Non-Orthogonal Multiple Access," 3GPP TSG RAN WG1 Meeting #93, R1-1807023, Busan, South Korea (May 21-25, 2018).
Interdigital Inc., "On Procedures Related to Non-Orthogonal Multiple Access," 3GPP TSG RAN WG1 Meeting #92bis, R1-1804861, Sanya, China (Apr. 16-20, 2018).
International Telecommunication Union, "IMT Vision—Framework and overall objectives of the future development of IMT for 2020 and beyond; M Series Mobile, radio determination, amateur and related satellite services," Recommendation ITU-R M.2083-0 (Sep. 2015).
Motorola, "Scheduling Request Mechanism for EUTRA Uplink," 3GPP TSG RAN1#51, R1-074599, Jeju, Korea (Nov. 5-9, 2007).
Intel Corporation,"NOMA related procedure," 3GPP TSG RAN WG1 Meeting #92, R1-1802427, Athens, Greece (Feb. 26-Mar. 2, 2018).
NTT Docomo, Inc., "SLS evaluation on uplink multiple access," 3GPP TSG RAN WG1 Meeting #86bis, R1-1610077, Lisbon, Portugal (Oct. 10-14, 2016).

* cited by examiner

METHOD AND APPARATUS FOR COLLISION MITIGATION AND COMPLEXITY REDUCTION FOR NOMA

CROSS-REFERENCE TO RELATED APPLICATIONS

This application is the U.S. National Stage, under 35 U.S.C. § 371, of International Application No. PCT/US2019/025845 filed Apr. 4, 2019, which claims the benefit of U.S. Provisional Application No. 62/652,781 filed Apr. 4, 2018, the contents of which are incorporated herein by reference.

BACKGROUND

Based on the general requirements set out by ITU-R, NGMN and 3GPP, a broad classification of the use cases for emerging 5G systems may be depicted as follows: Enhanced Mobile Broadband (eMBB), Massive Machine Type Communications (mMTC) and Ultra Reliable and Low Latency Communications (URLLC). Different use cases may focus on different requirements such as higher data rate, higher spectrum efficiency, low power and higher energy efficiency, lower latency and higher reliability. A wide range of spectrum bands ranging from 700 MHz to 80 GHz are being considered for a variety of deployment scenarios.

It is well known that as the carrier frequency increases, severe path loss becomes a crucial limitation to guarantee the sufficient coverage area. Transmission in millimeter wave systems could additionally suffer from non-line-of-sight losses, (e.g., diffraction loss, penetration loss, Oxygen absorption loss, foliage loss, and the like). During initial access, the base station and a WTRU need to overcome these high path losses and discover each other. Utilizing dozens or even hundreds of antenna elements to generated beam formed signal is an effective way to compensate the severe path loss by providing significant beam forming gain. Beamforming techniques may include digital, analogue and hybrid beamforming.

SUMMARY

A method and apparatus for performing autonomous transmission for performing collision mitigation and complexity reduction for non-orthogonal multiple access (NOMA) transmissions are disclosed. A wireless transmit/receive unit (WTRU) may receive a configuration with multiple SRs and associated demodulation reference signal (DMRS) subsets, randomly select a DMRS subset and select a SR configuration according to the randomly selected DMRS subset based on the received configuration. The WTRU may transmit an SR associated with the selected DMRS subset. Next the WTRU may select a DMRS from the selected DMRS subset, and transmit the selected DMRS with a data transmission. Each SR associated with DMRS subsets may be distinguished by time and frequency resources, sequence index value, or PUCCH index value.

Each SR associated with DMRS subsets may be distinguished by a sequence index value.

Each SR associated with DMRS subsets may be distinguished by a PUCCH index value. Further, the WTRU may be configured to autonomously determine a transmission type that is one of grant-based or grant-free.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
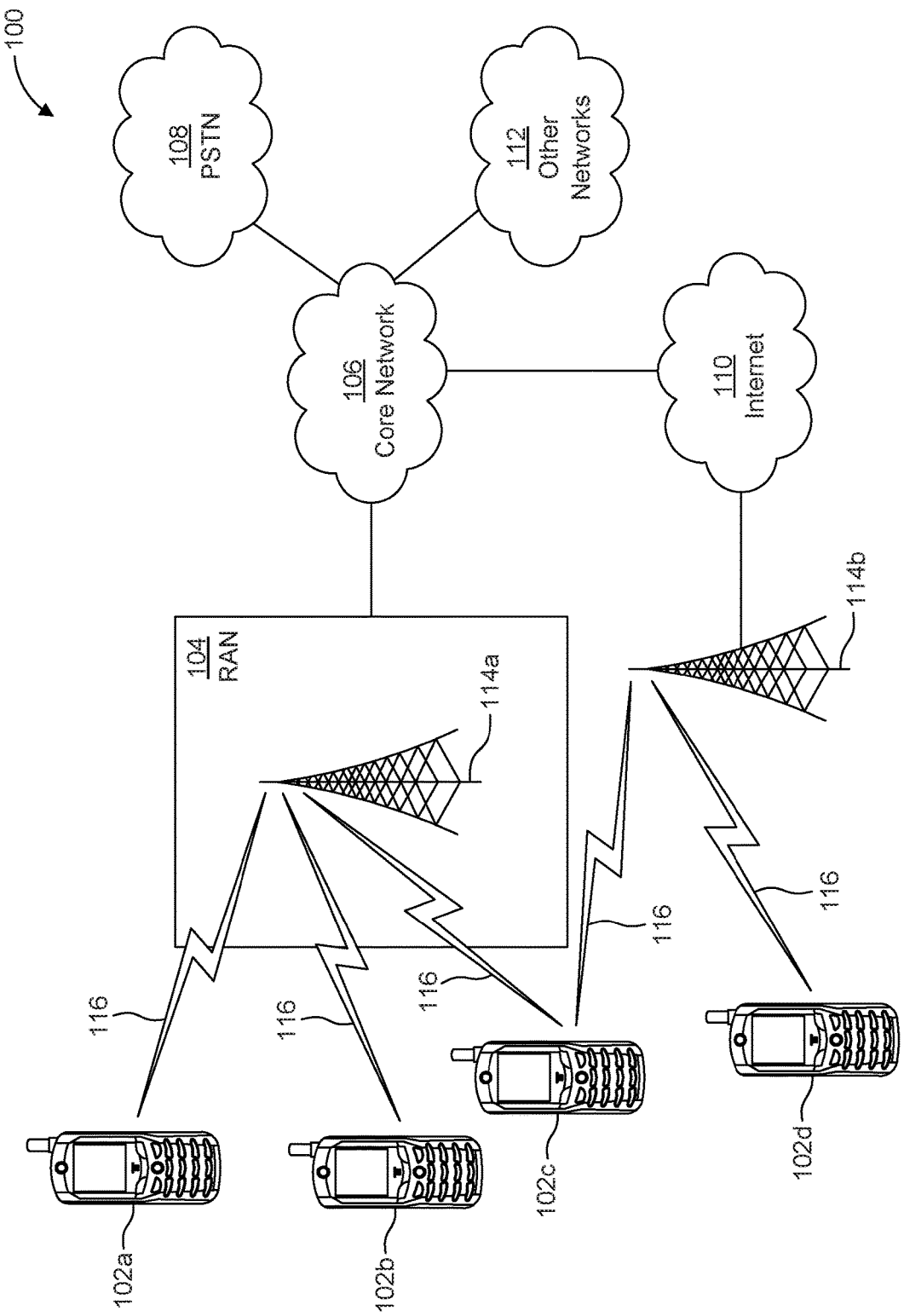
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Wi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
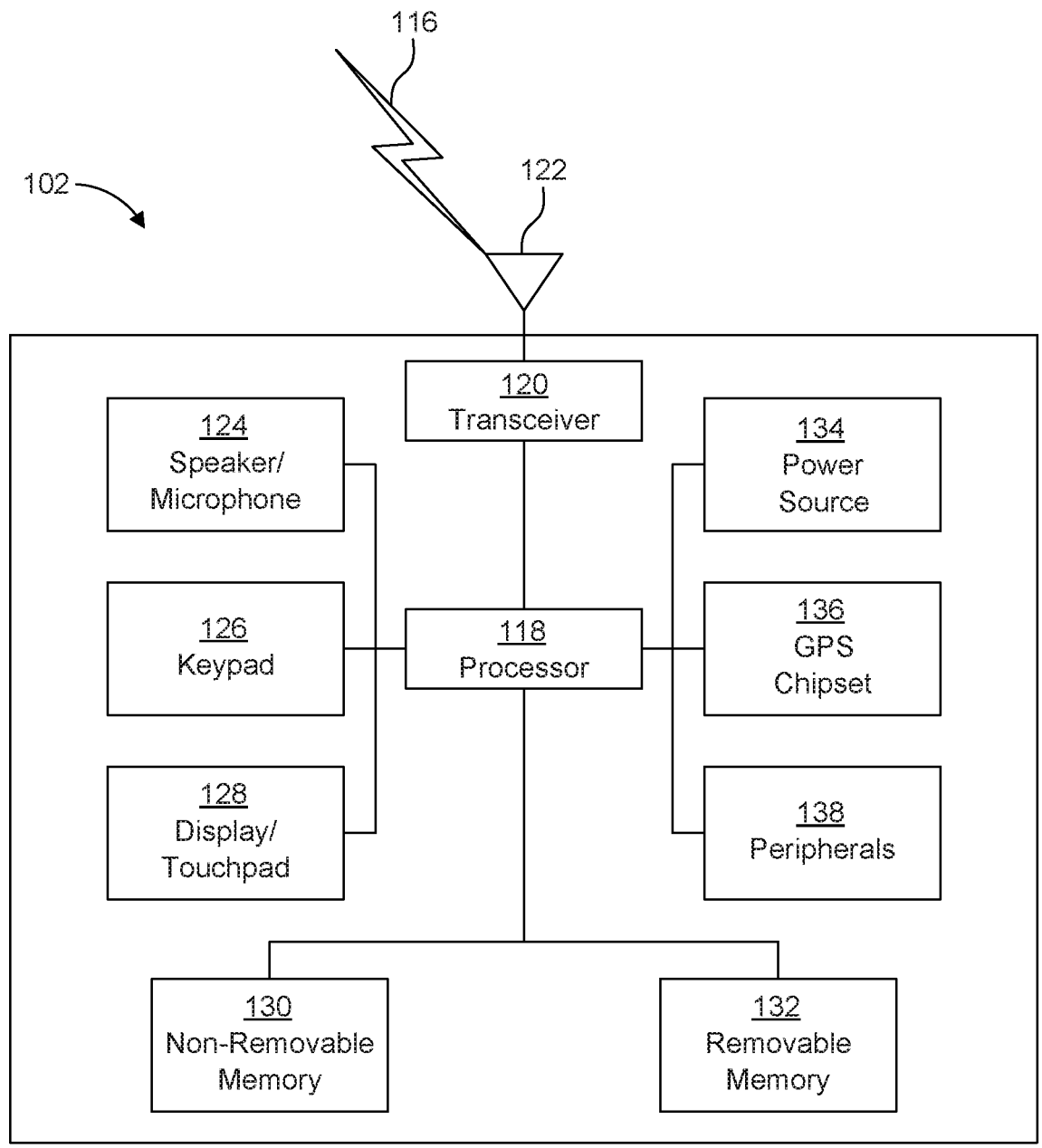
FIG. 1B is a system diagram illustrating an example wireless transmit/receive unit (WTRU) that may be used within the communications system illustrated in FIG. 1A according to an embodiment.
Figure 1C:
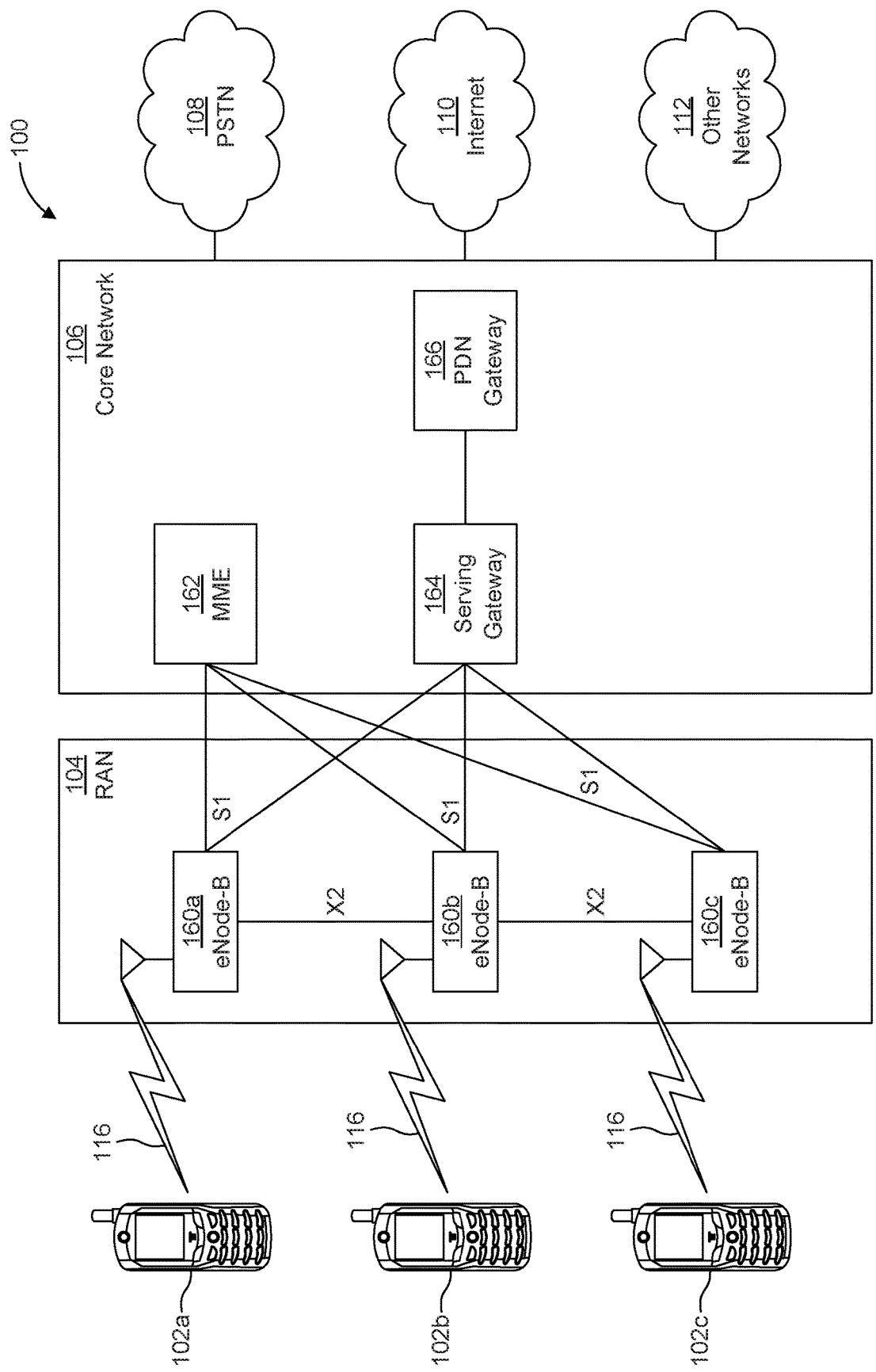
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
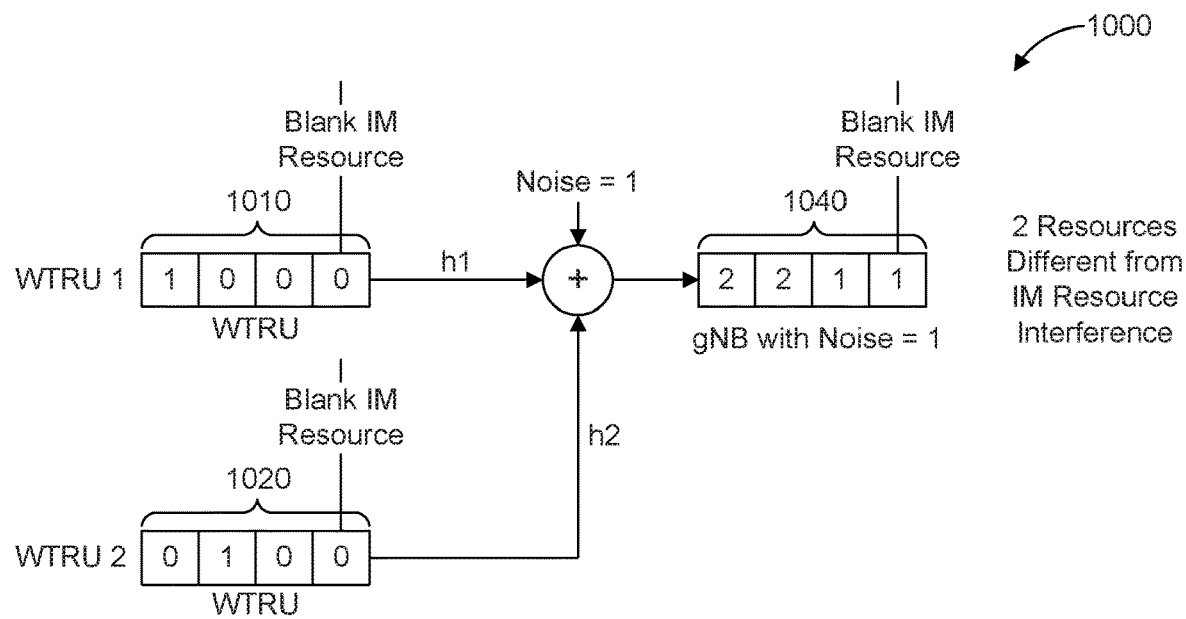
FIG. 10 shows an exemplary transmission with 2 WTRUs using a DMRS (colliding DMRS) with power control that processes a collision identification resource and identifies if there is a collision or not.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
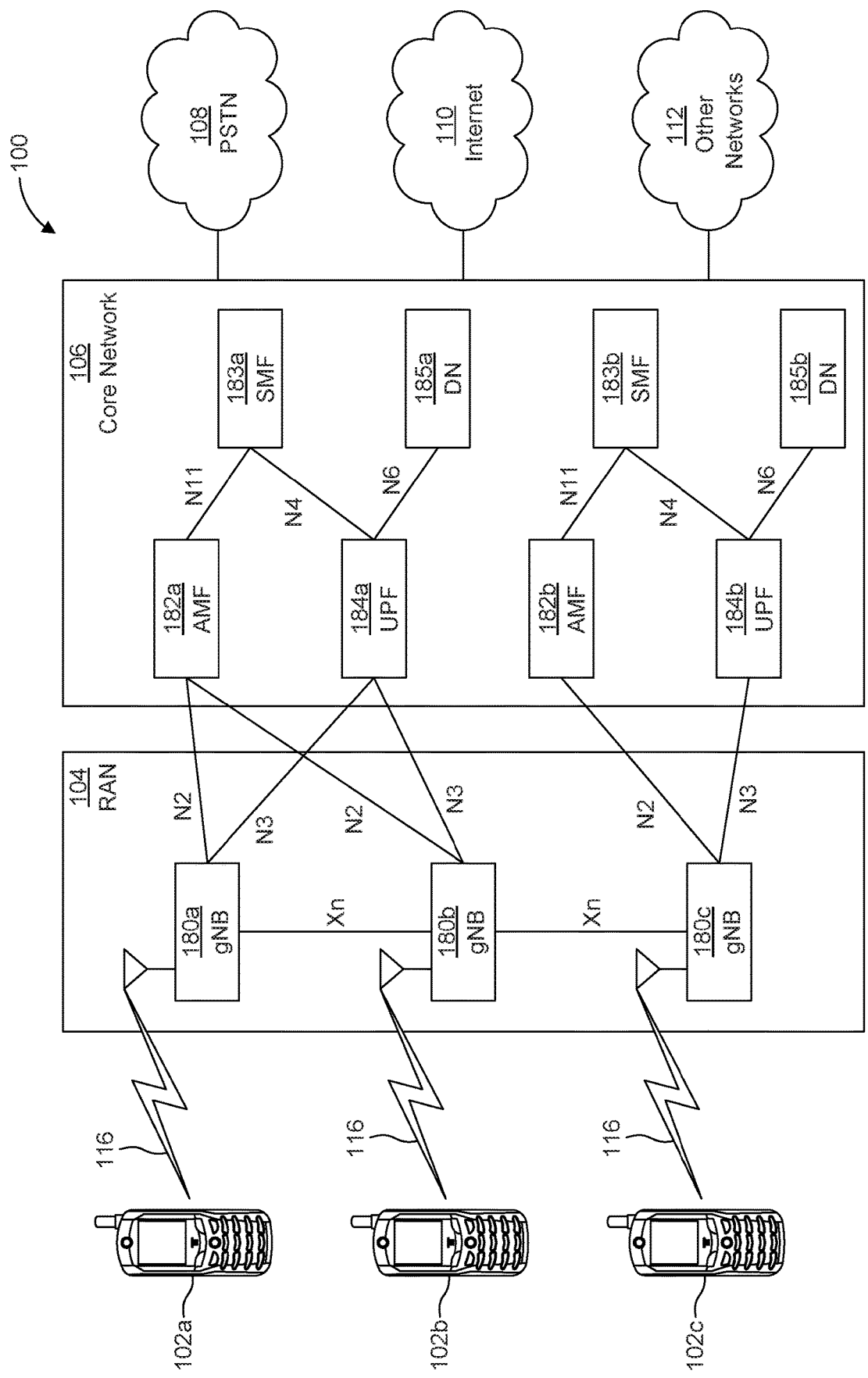
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data. Similar to LTE, the basic multiple access scheme for NR is orthogonal for both downlink and uplink data transmissions, meaning that time and frequency physical resources of different users are not overlapped. On the other hand, non-orthogonal multiple-access (NOMA) schemes recently gained wide interest, prompting Rel-13 study item on downlink multi-user superposition transmission (MUST) and some initial study in Rel-14 study item on NR.

Many non-orthogonal multiple-access schemes are evaluated in the Rel-14 NR study item. For the evaluated scenarios the results show significant benefit of non-orthogonal multiple access in terms of UL link-level sum throughput and overloading capability, as well as system capacity enhancement in terms of supported packet arrival rate at given system outage. The Rel-14 study item further identified that NR should at least target UL non-orthogonal multiple access at least for mMTC.

For non-orthogonal multiple access, there will be interference between transmissions using overlapping resources. As the system load increases, this non-orthogonal characteristic is more pronounced. To combat the interference between non-orthogonal transmissions, transmitter side schemes such as spreading (linear or non-linear, with or without sparseness) and interleaving are normally employed to improve the performance and ease the burden of advanced receivers.

Non-orthogonal transmission can be applied to both grant-based and grant-free transmission. The benefits of non-orthogonal multiple access, particularly when enabling grant-free transmission, may encompass a variety of use cases or deployment scenarios, including eMBB, URLLC, mMTC, and the like.

With new applications emerging for cellular technology, the importance of supporting higher data rates, lower latency, and massive connectivity continues to increase. For example, support for enhanced Mobile Broadband (eMBB) communications, Ultra-Reliable and Low-Latency Communications (URLLC) and massive Machine Type Communications (mMTC) has been recommended by the ITU, along with example usage scenarios and desirable radio access capabilities. With a broad range of applications and usage scenarios, radio access capabilities may differ in importance across the range.

Traditional multiple access schemes used in wireless cellular communication systems assign time/frequency/spatial resources such that each user signal does not interfere with other users' signals. This type of access is referred to as Orthogonal Multiple Access (OMA), where multiplexing the users on orthogonal resources may be performed in the time domain (TDM), in the frequency domain (FDM), or in the spatial domain (SDM).

Non-orthogonal multiple access schemes (NOMA) have been developed in recent years, for example to address some of the challenges of wireless communications such as high spectral efficiency and massive connectivity. A NOMA scheme may multiplex users in the code-domain. Different users may be assigned different spreading codes and may be multiplexed over the same time-frequency resources.

Figure 2:
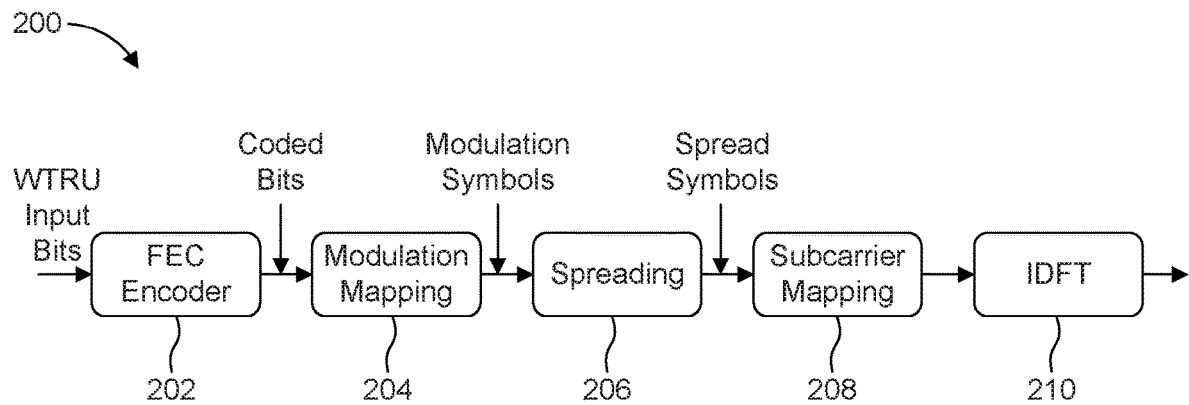
FIG. 2 is a high level block diagram of a transmitter for code-domain based non-orthogonal multiple access (NOMA) schemes.

FIG. 2 shows an example of a high level block diagram of a transmitter 200 for the code-domain based NOMA scheme. As shown in FIG. 2, transmitter 200 includes an FEC Encoder 202, a modulation mapping process 204, a spreading process 206, a subcarrier mapping process 208, and an IFDT process 210. First, the FEC Encoder 202 codes bits and sends them to the modulation mapping process 204. Next, the modulation mapping process 204 modulates the coded bits to produce modulationed symbols and then sends them to the spreading process 206. After that, the spreading process 206 spreads the modulation symbols and provides them to the subcarrier mapping process 208. Next, the subcarrier mapping process 208 maps the spread symbols to subcarriers and provides them to the IFDT process 210. Lastly, the IFDT process 210 applies an IFDT process to the mapped symbols in preparation for sending a NOMA transmission. For certain NOMA schemes, the spreading sequences may be short; for example, they may be four to eight samples.

WTRUs may need to randomly select MA signature and demodulation reference signal (DMRS) for NOMA operations. A collision could occur for the NOMA procedures in all the areas including UL transmission detection. A NOMA collision may be handled by one or more of several different methods, such as extending MA signature pool size, extended DMRS pool size and using random back-off time for transmission and retransmission. A NOMA collision may also be handled by dedicated signaling such as scheduled MA signature and DMRS for a particular WTRU.

Figure 3:
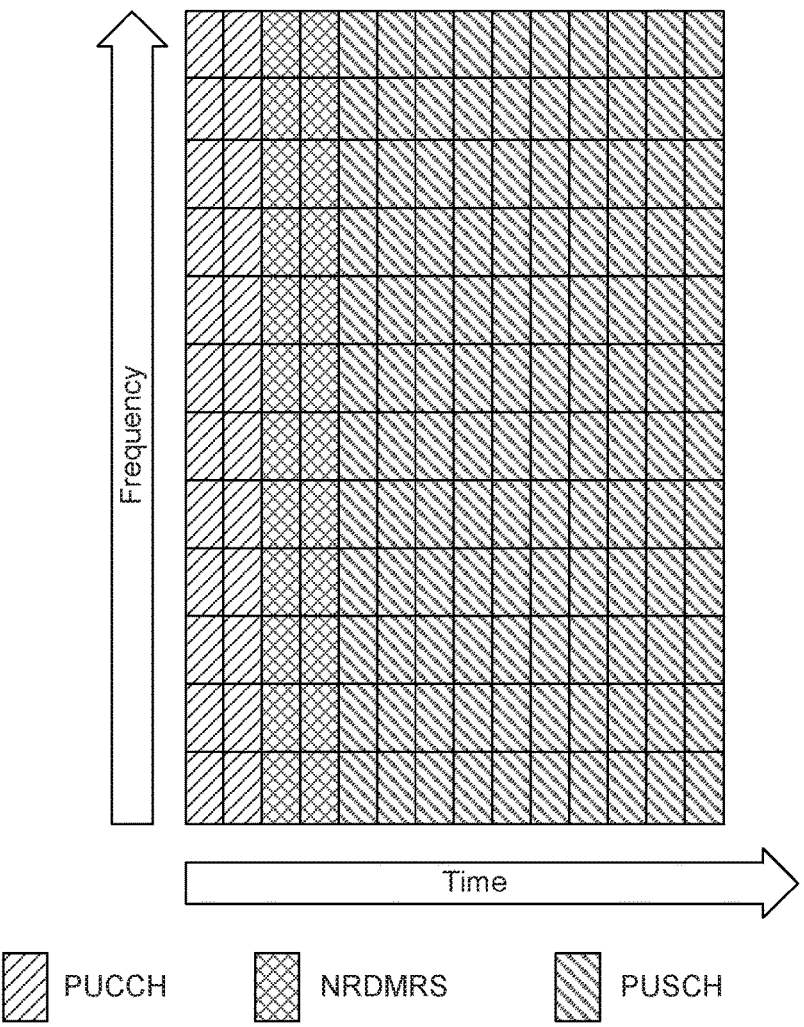
FIG. 3 shows an example of an NR RB with one possible demodulation reference signal (DMRS) configuration occupying two OFDM symbols.

In addition, in a NOMA transmission, the receiver may need to perform channel estimation using reference signals sent by the transmitter. FIG. 3 is an example diagram of an uplink subframe for performing NOMA transmissions having 14 symbols in the time domain and 12 subcarriers in the frequency domain. As shown in FIG. 3, the first two symbols in time are allocated for the PUCCH. The third and fourth symbols in time may be allocated for the NR-DMRS. The remaining 10 symbols in time may be allocated for the PUSCH.

As such, FIG. 3 shows an example of an NR RB with one possible DMRS configuration occupying two OFDM symbols, while the rest of the RB is filled with other uplink transmissions. In this example, the DMRSs are mapped on two OFDM symbols that are front loaded before the PUSCH transmission. A NR DMRS may be configured in one or two OFDM symbols. In an example, there may be two possible Orthogonal Cover Codes (OCC), two possible time shifts, and three possible frequency shifts. This yields a maximum orthogonal multiplexing capability of twelve users for the two OFDM symbol case.

However, some NOMA use cases, such as mMTC, may involve many WTRUs well beyond the capacity of any DMRS configuration. In such use cases, all transmitters may be configured to operate in NOMA mode, but they may not all be active at the same time because of the sporadic nature of their transmissions. However, problems may occur when more than one user attempts to transmit at the same time with the same DMRS configuration.

In what follows, embodiments for control signaling for NOMA are disclosed. Several embodiments for reducing the collision likelihood of WTRU DMRSs are described. Several embodiments for reducing NOMA blind detection complexity are also disclosed.

In one embodiment, autonomous transmission type selection for NOMA may be used. A WTRU may autonomously select a transmission type (e.g., grant-based or grant-free transmission) for NOMA transmission.

In one embodiment, multi-type NOMA request signal (NRS) or scheduling request (SR) may be used to assist NOMA transmission. One type NRS or SR may be used to request a grant for one type NOMA transmission while another type NRS or SR may be used to request access for another type NOMA transmission. For example, the type 1 NRS or SR may be used to request a grant for grant-based NOMA transmission while type 2 NRS or SR may be used to request for grant-free NOMA transmission.

Figure 4A:
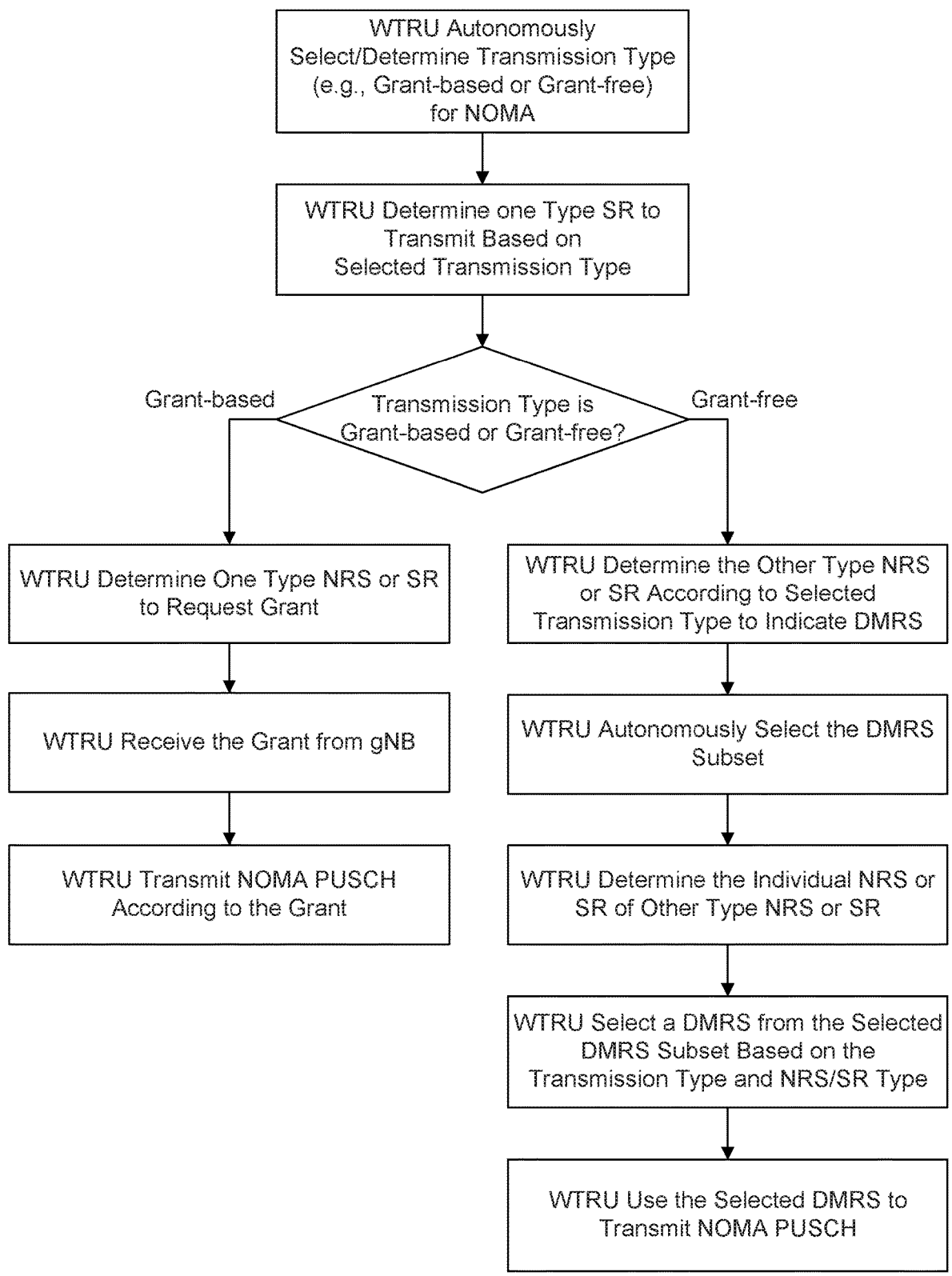
FIG. 4A shows a flowchart for performing autonomous transmission type selection for NOMA.
Figure 4B:
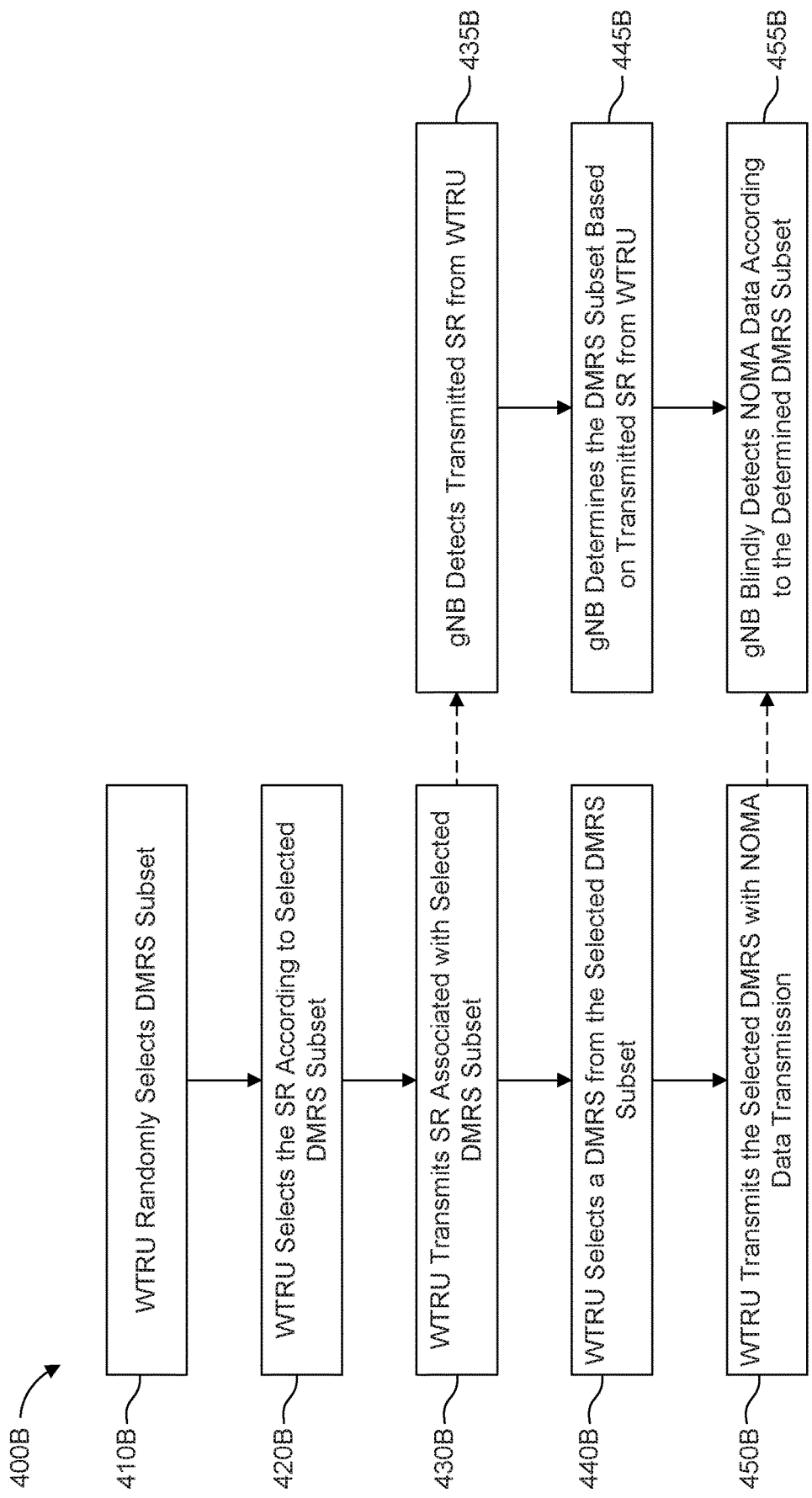
FIG. 4B shows a flowchart where a WTRU selects or transmits a SR, or selects or transmits a DMRS, both communicating with a gNB.
Figure 4C:
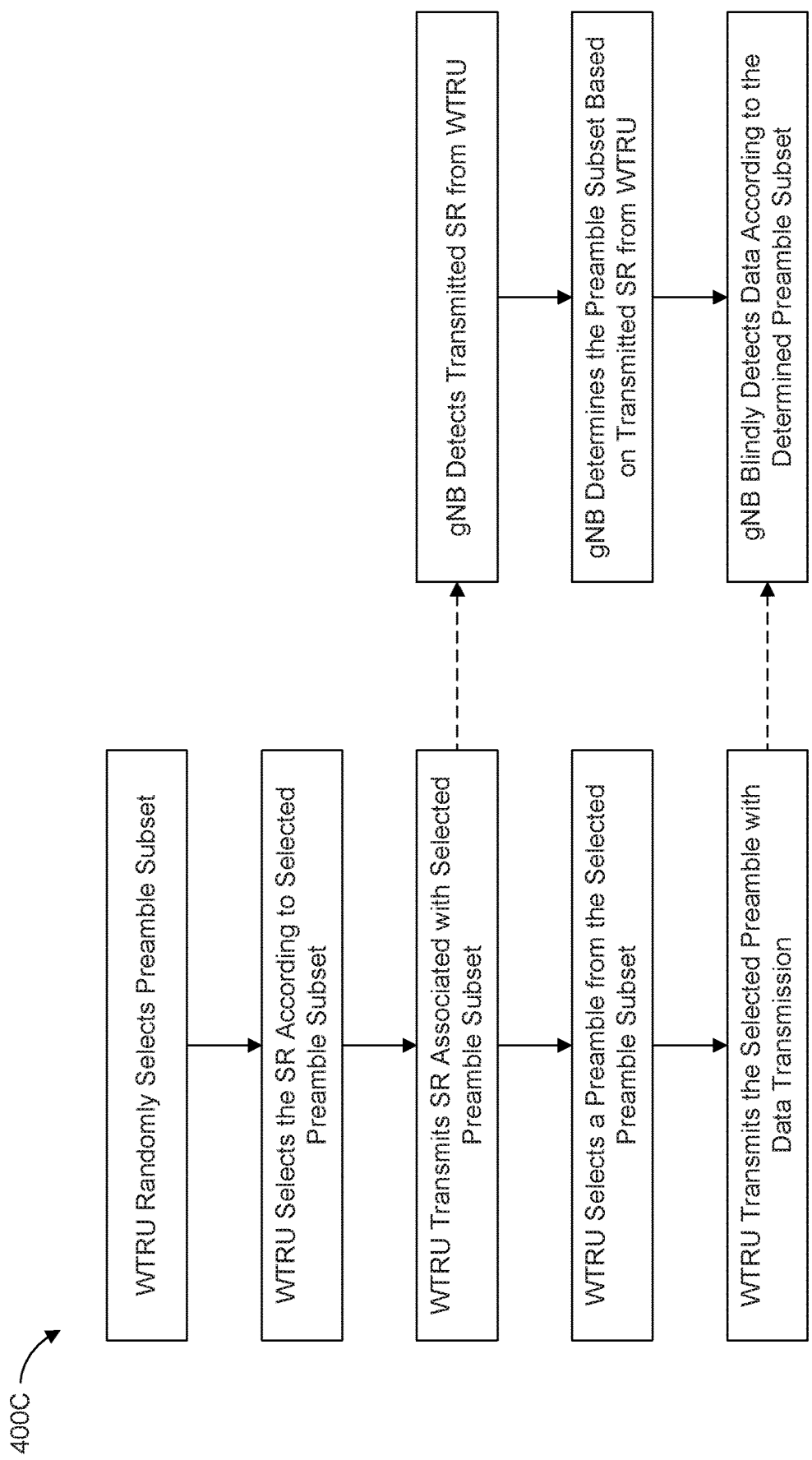
FIG. 4C shows a flowchart where a WTRU selects or transmits a SR, or selects or transmits a Preamble, both communicating with a gNB.

FIG. 4A shows a flowchart for a performing DMRS assisted NOMA transmission using autonomous transmission type selection for NOMA. FIG. 4B shows a flowchart where a WTRU selects or transmits a SR, or selects or transmits a DMRS for communicating with a gNB. FIG. 4C shows a flowchart where a WTRU selects or transmits a SR, or selects or transmits a preamble, both communicating with a gNB.

As shown in FIG. 4A, a WTRU may autonomously select and/or determine the transmission type (e.g., grant-based or grant-free) for NOMA. A WTRU may determine one type NRS or SR to transmit NOMA data based on the selected transmission type. The transmission type may employ grant-based or grant-free type transmissions or one or more other transmission types for NOMA transmission.

If the selected transmission type is a grant-based type transmission, a WTRU may determine one type NRS or SR to request grant. The WTRU may then receive the grant from the gNB. The WTRU may transmit NOMA data (such as PUSCH and possibly PUCCH) or one or more other NOMA UL channels according to the received grant.

Otherwise, if the selected transmission type is a grant-free type transmission, a WTRU may determine another type NRS or SR. The determined other type NRS or SR may be used to indicate DMRS subset. In order to determine the individual NRS or SR, the WTRU may need to determine the DMRS subset first. The WTRU may randomly select a DMRS subset from a DMRS subset pool. The WTRU may determine the NRS or SR based on the selected DMRS subset. After DMRS subset is selected and NRS or SR is decided, the WTRU may then randomly select a DMRS from the selected DMRS subset. The WTRU may transmit NOMA data e.g., PUSCH or possible PUCCH or one or more other UL channels for NOMA using the selected DMRS.

Furthermore, for a NOMA transmission type employing grant-free transmission, a different type NRS or SR may be used to indicate the association for DMRS or MA signatures. For example, one type NRS or SR may be used to indicate the association for DMRS while another type NRS or SR may be used to indicate the association for MA signature.

For example, three types NRS or SR may be used. A Type-1 NRS or SR may be used to request regular grant such as uplink grant for PUSCH transmission for NOMA. A Type-2 NRS or SR may be used to indicate which DMRS or DMRS subset. A Type-3 NRS or SR may be used to indicate which MA signature or MA signature subset should be used.

Different Type-2 NRSs or SRs may be associated with different DMRS subset so that by sending Type-2 NRS or SR, a gNB may be able to learn which DMSR subset that a WTRU may select (e.g., randomly) its DMRS from and thus transmit the selected DMRS accordingly. Similarly, different Type-3 NRSs or SRs may be associated with different MA signature subsets so that by sending a Type-3 SR, a gNB may be able to learn which MA signature subset that a WTRU may select (e.g., randomly) its MA signature from and thus transmit the selected MA signature accordingly.

A gNB may also, or alternatively, be able to blindly detect the DMRS and user data associated with the DMRS belonging to this DMRS subset.

FIG. 4B shows, through a flowchart, how a WTRU selects and transmits a SR and DMRS, respectively, with NOMA data transmission to a gNB through process 400B. First, at 410B a WTRU may randomly select a DMRS subset. At 420B the WTRU may select a SR according to the selected DMRS subset. Next, the WTRU may transmit the SR from sub process 420B to a gNB, 430B.

On a condition that the WTRU selects the SR according to the DMRS subset 430B, a gNB may detect the transmitted SR from the WTRU, 435B. After this, the gNB may determine the DMRS subset based on the transmitted SR from the WTRU, 445B. Next, the gNB may blindly detect NOMA data according to the determined DMRS subset, 455B.

Continuing with the processes 400B, of FIG. 4B, the WTRU may select a DMRS from the selected DMRS subset, 440B. Finally, the WTRU may transmit the selected DMRS with NOMA data transmission to the gNB, 450B. This NOMA data transmission may be incorporated and used in 455B where the gNB blindly detects NOMA data according to the determined DMRS subset.

As an alternative to how an autonomous transmission solution may be implemented as shown in FIG. 4B, which uses a DMRS subset, FIG. 4C describes how an autonomous transmission solution may be implemented by replacing the DRMS subset used in FIG. 4B with a Preamble subset. The solution shown in FIG. 4C is a two-step RACH embodiment. Other than replacing DMRS subset with Preamble Subset, FIG. 4B and FIG. 4C, flow-wise, are identical.

In one embodiment, a multi-type NOMA request signal (NRS) or scheduling request (SR) may be used to assist hierarchical NOMA transmission. One type NRS/SR may be used to request grant while another type NRS/SR may be used to indicate the association for DMRS. A DMRS may be associated with MA signature. Based on the NRS/SR and the association for DMRS-to-MA Signature, a MA signature may be identified for NOMA Hierarchical NOMA level 1: A NRS/SR may be associated with DMRS for efficient transmission. For example, one NRS/SR may be associated with a subset of DMRSs. Once the NRS/SR is detected, the search space for DMRS may be narrowed down. Instead of searching through the entire DMRS pool, a sub-pool or a subset of DMRSs may be searched. This may significantly reduce the blind detection complexity for a NOMA receiver.

Hierarchical NOMA level 2: A DMRS may be associated with MA signature for efficient transmission. For example, one DMRS may be associated with a subset of MA signatures. Once the DMRS is detected, the search space for MA signature may be narrowed down. Instead of searching through the entire MA signature pool, a sub-pool or a subset of MA signatures may be searched for data detection. This may significantly reduce the blind detection complexity for a NOMA receiver.

In another embodiment, a multi-type NOMA request signal (NRS) or scheduling request (SR) may be used to assist hierarchical NOMA transmission. The type-1 NRS/SR may be used to indicate the association for a DMRS and the type-3 NRS/SR may be used to indicate the association for MA signatures.

For example, three types SR may be used. The first type SR may be used to request regular grant such as uplink grant for PUSCH transmission for NOMA. The second type SR may be used to indicate which DMRS or DMRS subset should be used. Different second type SRs may be associated with different DMRS subsets so that by sending second type SR, a gNB may be able to obtain which DMRS subset that a WTRU may select (e.g., randomly) the DMRS from, and thus transmit the selected DMRS accordingly. The third type SR may be used to indicate which MA signature or MA signature subset may be used. Similarly, different third type SRs may be associated with different MA signature subsets so that by sending the third type SR, gNB may be able to obtain which MA signature subset that a WTRU may select (e.g., randomly) the MA signature from, and thus transmit the selected MA signature accordingly. A gNB may be able to blindly detect the DMRS, MA signatures, and user data associated with the DMRS and/or MA signatures belonging to the DMRS subset and/or MA signature subset. For another example, more than one DMRS may be associated with a subset of MA signatures. Once a DMRS is detected, the subset is identified.

Figure 5:
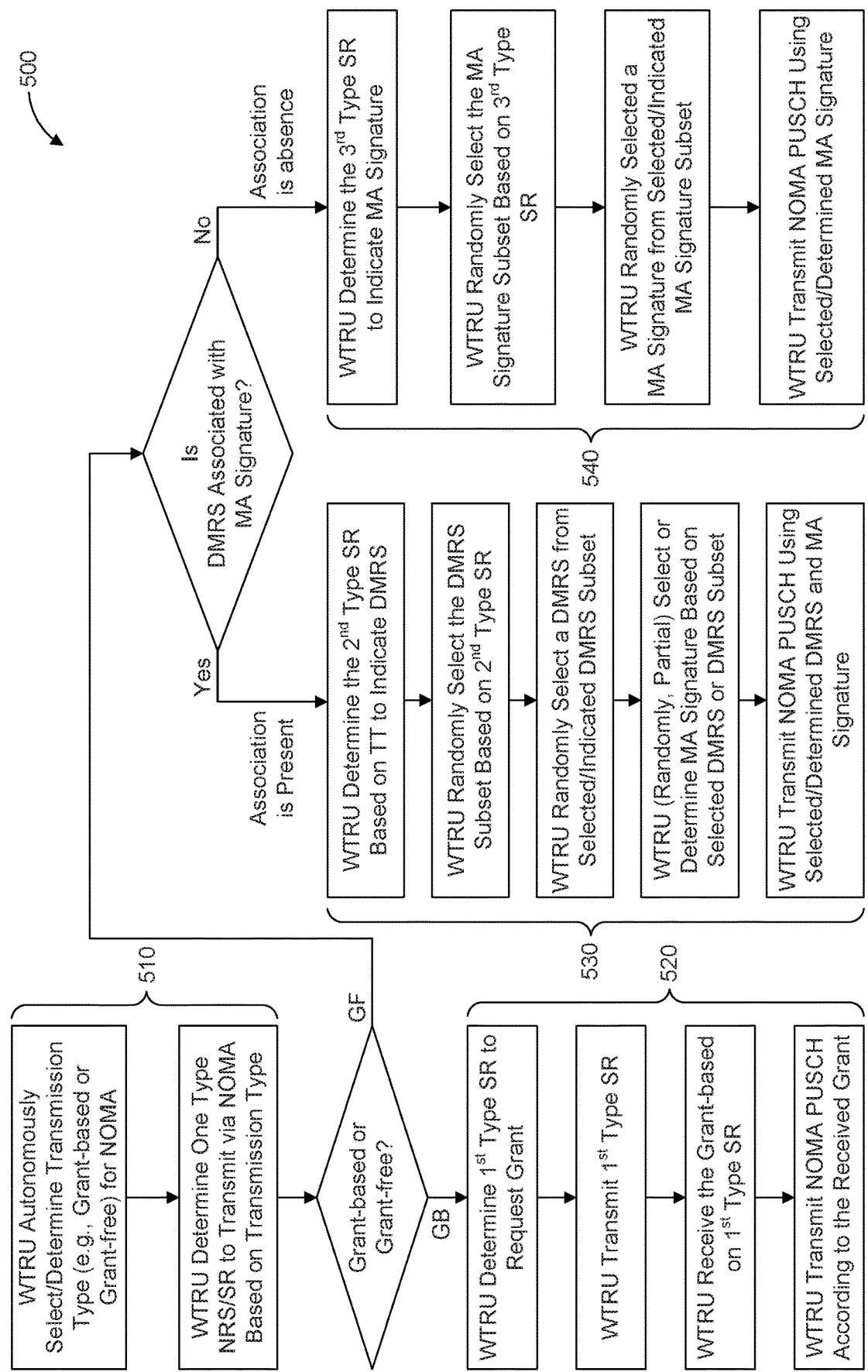
FIG. 5 shows a flowchart for performing hierarchical autonomous transmission type with multi-type NRS or SR-assisted DMRS & MA transmission for NOMA.

FIG. 5 shows a flowchart for performing hierarchical autonomous transmission type with multi-type NRS or SR-assisted DMRS and MA transmission for NOMA represented by example process 500. As shown in FIG. 5, example process 500, a WTRU may initially perform hierarchical transmission by performing selections, 510. First, a WTRU may select or determine transmission type (e.g., grant-based or grant-free) for NOMA. Second, the WTRU may select or determine one type NRS or SR to transmit via NOMA based on transmission type. After this, a WTRU may determine whether grant-based or grant-free transmission is selected or chosen.

If grant-based transmission is selected or chosen, sub process 520 may proceed with NOMA transmission. In sub process 520, the WTRU may determine a 1st type SR to request a grant. Second, the WTRU may transmit the 1st type SR. Third, the WTRU may receive the grant based on the 1st type SR. Lastly, for grant-based, the WTRU may transmit NOMA PUSCH according to the received grant.

If a grant-free transmission is selected or chosen, the WTRU may determine if the DMRS is associated with a MA signature, or, in other words, whether an association is present or absent, 515. If the grant-free transmission has an association present, sub process 530 may proceed. First, the WTRU may determine a 2nd type SR based on TT to indicate DMRS. Second, the WTRU may randomly select a DMRS subset based on the 2nd type SR. Third, the WTRU may randomly select a DMRS from the selected or indicated DMRS subset. Fourth, the WTRU may randomly, or by a partially random method, select or determine a MA signature based on the selected DMRS or DMRS subset. Lastly, when the association is present, the WTRU may transmit to NOMA PUSCH using the selected or determined DMRS and MA signature.

Otherwise, if the grant-free transmission has an association absent, sub process 540 may proceed with the following four sequential steps. First, the WTRU may determine a 3rd type SR to indicate a MA signature. Second, the WTRU may randomly select the MA signature subset based on the 3rd type SR. Third, the WTRU may randomly select a MA signature from the selected or indicated MA signature subset. Fourth and lastly, when an association is absent, the WTRU may transmit to NOMA PUSCH using the selected or determined MA signature.

To identify the collision of a parameter due to selection of the same parameter by multiple STAs, (for example, a DMRS or a Multiple Access Signature (MAS)), a collision identification indicator may be transmitted by the WTRU with the NOMA transmission. The collision of a parameter may be the transmission of exactly the same parameter (e.g. the same DMRS) or the transmission of parameters that are not compatible (e.g., MAS that may be difficult to distinguish between each other).

The collision identification indicator may be transmitted in the same resource or at the same time as the NOMA transmission, for example, in the same slot or NOMA zone. On receipt and processing of the indicator, the gNB may send the WTRU information on the collision status of the parameter. The WTRU may use this information in the next NOMA transmission in the case that the NOMA transmission failed, for example, it may randomly choose another parameter to avoid the collision.

The collision identification indicator may be transmitted in a different resource or at a different time from the NOMA transmission, for example in a slot or NOMA zone prior to the actual NOMA transmission. On receipt and processing of the indicator, the gNB may send the WTRU information on the collision status of the parameter. The WTRU may use this information preemptively to modify the NOMA transmission, for example, the upcoming NOMA transmission, and prevent the collision.

In the event that the gNB is able to identify a parameter collision, the WTRU may receive information from the gNB on the specific parameter that collided.

The information that the WTRU receives may be WTRU specific. This may occur, for example, if the gNB is able to identify the specific colliding WTRUs. The information may include configuration information from the gNB to change one or more NOMA parameters. The WTRU specific information may be received by the gNB from one or more of a downlink control channel, or a downlink data channel.

The information that the WTRU receives may not be WTRU specific. This may occur, for example, if the gNB is able to identify a collision but is not able to uniquely identify the specific colliding WTRUs. This may also occur, for example, if the gNB is able to identify a collision and is able to identify the specific colliding WTRUs. The WTRU may receive this information on a general channel, for example, the information may be broadcast or multicast from the gNB. The WTRU may receive information on at least one or more colliding parameters. The WTRU may receive information on at least one or more of the non-colliding parameters. If a WTRU is in the non-colliding set of parameters, the WTRU may initiate the NOMA transmission. If a WTRU has a parameter in the colliding set of parameters, the WTRU may select new parameters based on the collision information from the gNB. For example, the WTRU may select a new parameter by selecting parameters that include the colliding set of parameters and the parameters not chosen but exclude the set of parameter in the non-colliding set.

In one example, in scenarios where the multiple access signature may need the DMRS to enable proper decoding (e.g., power domain NOMA), detecting collisions of the DMRS may be used to reduce the complexity of the gNB decoding procedure by stopping the gNB decoding procedure in the presence of an erroneous channel estimate. The gNB may be able to send information on the collision (for example, a list of all the DMRSs that have collided and those that have not collided) to the WTRUs involved preventing the scenario where nothing is sent back.

Figure 6:
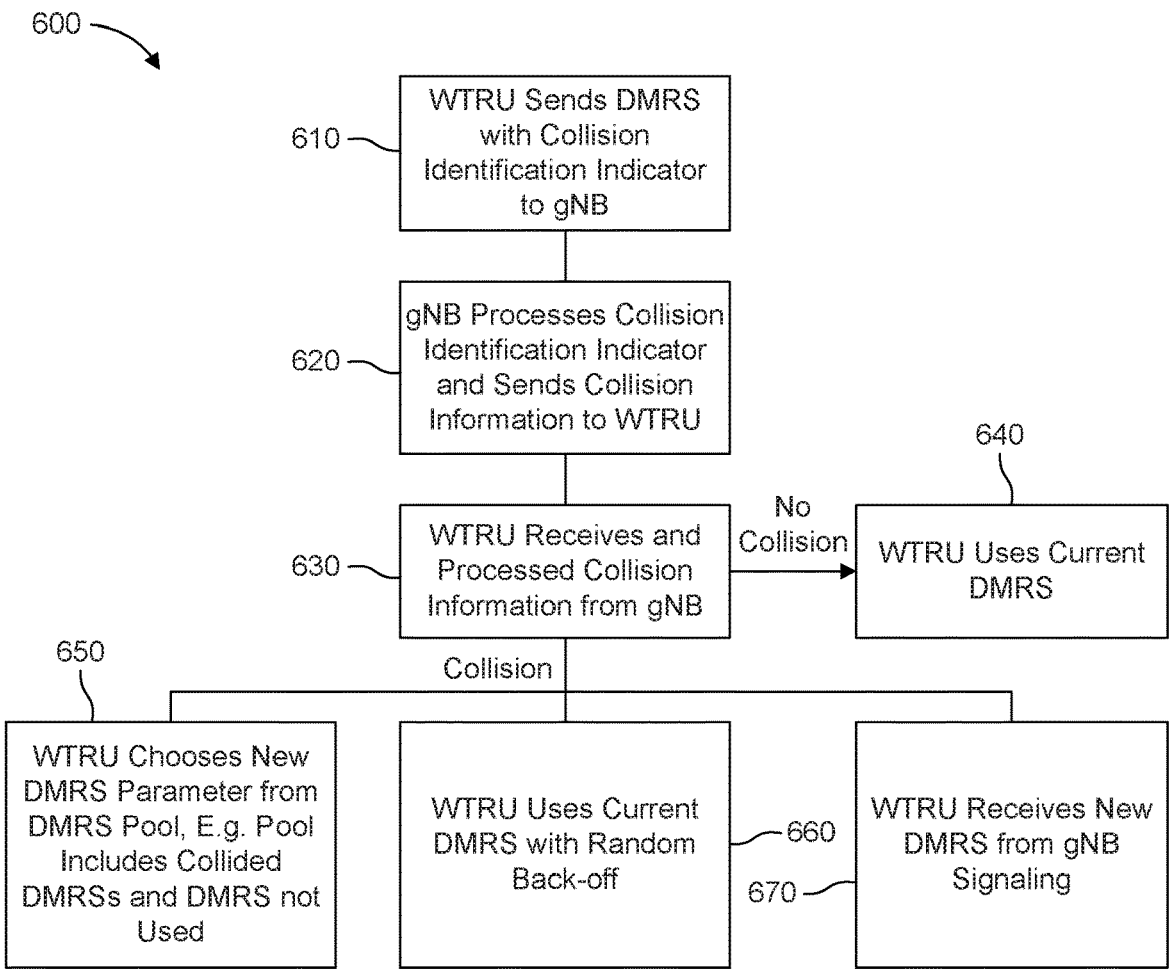
FIG. 6 shows a WTRU procedure with collision identification indicator.

FIG. 6 shows another example procedure 600 for DMRS transmission using a collision identification indicator. Each WTRU may transmit a DMRS with a collision identification indicator sequence in a collision identification region, 610. The gNB may then process the collision identification indicator and send collision information to the WTRU, 620. The WTRU receives the processed collision information from gNB, 630, and if no collision occurs the WTRU uses the current DMRS, 640. If a collision occurs the WTRU either: chooses a new DMRS parameter from the DMRS pool, 650; uses a current DMRS with random back-off, 660; or receives a new DMRS from the gNB, 670. In one example, the collision identification regions for each DMRS may be orthogonal to each other. The WTRU may send a collision identification sequence for a selected DMRS to the gNB to enable the gNB to identify if multiple WTRUs may have used the same DMRS. In one example, the WTRU may randomly select a collision identifier. In another example, the WTRU may be assigned a specific collision identifier by the gNB.

The gNB may process this information and then transmit gNB collision information to the WTRU. In one example the collision information is broadcast to all the WTRUs. In another example, the collision information is unicast to each WTRU that has a collision.

Each WTRU may listen for the gNB collision information. In one example, the gNB collision information includes parameters that have collided. In another example, the gNB collision information may include parameters that have not collided. In another example, the gNB collision information may include the WTRU IDs associated with the parameters that have collided. In one example, the gNB information may include specific parameters for WTRUs that have parameters that have collided.

If the WTRU receives information that the DMRS did not collide, the WTRU may transmit its information using the selected DMRS.

If the WTRU receives information that DMRS collided (e.g., a collision NACK) from the gNB, the WTRU may take remedial steps to resolve the collision.

For example, the WTRU may randomly select a new DMRS from the DMRS pool. If the gNB indicates the DMRS parameters that have been selected and the DMRS values that have collided, the DMRS pool may be the set of DMRS that have collided and that have not been selected. The DMRS pool may be the set of DMRSs that have not been selected.

For example, the WTRU may use the same DMRS but use a randomly selected NOMA time-frequency resource to minimize the probability of collision.

Figure 7:
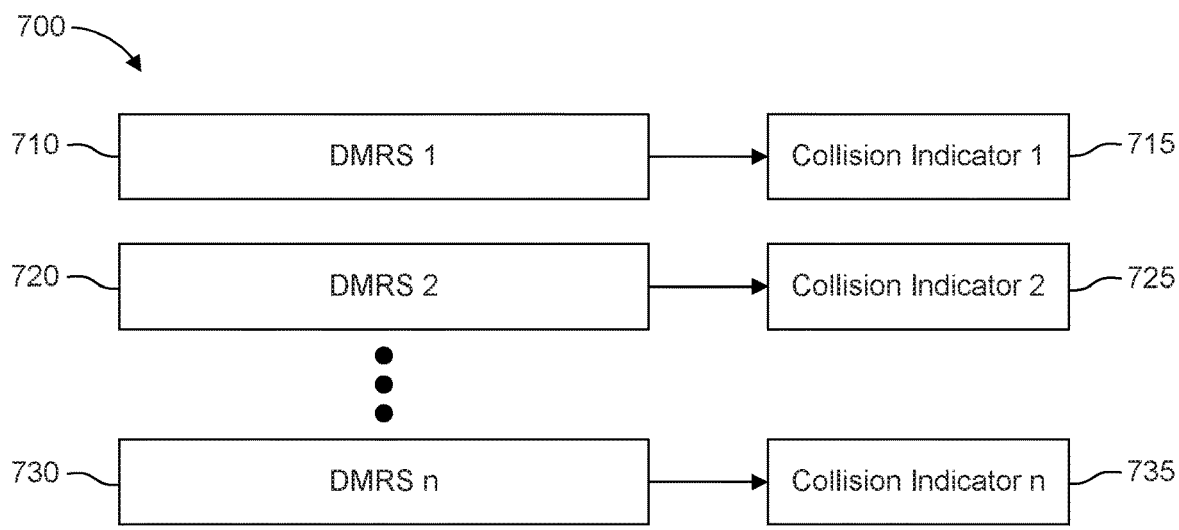
FIG. 7 shows a diagram of a collision identification indicator with a DMRS collision indicator dedicated to each DMRS.

Dedicated collision identification resource may be used. In one embodiment, the collision identification indicator may be sent in dedicated collision identification indicator resources for each DMRS sent. FIG. 7 shows a diagram of a collision identification indicator with a DMRS collision indicator dedicated to each DMRS. Further, as shown in FIG. 7, a dedicated collision identification indicator to a particular DMRS may accompany each DMRS sent. This is shown in FIG. 7 where a DMRS represented by block 710, named DMRS 1, may have its own dedicated collision identification resource named Collision Indicator 1, represented by block 715. An identical setup is shown in a DMRS represented by block 720, named DMRS 2, where DMRS 2 may be tied to a dedicated collision identification resource, named Collision Indicator 2, represented by block 725. Lastly, shown in FIG. 7, a specified number of DRMSs may be given dedicated collision identification indicators up to "DMRS n" reflected by blocks 730 and 735.

The dedicated collision identification indicator may be implemented by at least an energy detection method.

In the energy detection method, each DMRS is allocated a dedicated collision identification indicator resource. Each WTRU is allocated a resource (e.g. a set of resource elements), in the collision identification indicator resource. For example, a WTRU may randomly select a set of resource elements (or may be configured to transmit in a set or resource elements) within the collision identification indicator resource for the DMRS it sends. One or more resource elements in the resource may be dedicated to reference interference measurement used by the gNB to determine if there are multiple WTRUs colliding for a specific DMRS. This is illustrated in FIG. 8.

Figure 8:
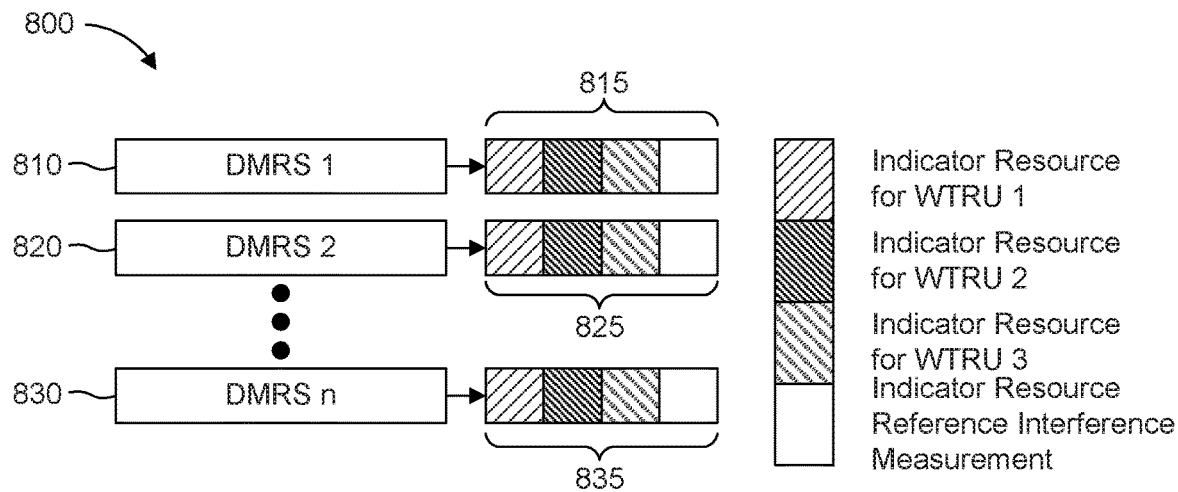
FIG. 8 shows a DMRS resources and associated collision indication resources.

As shown by an example in FIG. 8, through embodiment 800, a DMRS may be represented by 810, named DMRS 1. DMRS 1 may be assigned its own dedicated collision identification indicator resource represented by block 815. That collision identification indicator 815 may further have one or more resource elements. Each of these resource elements, may be an indicator resource for an individual WTRU.

Legend L shows that each small colored block may be directly associated with a single WTRU. Continuing to focus on 815, going from the left to right, the first small colored block may be a dedicated resource to WTRU1, as indicated by legend L. The second block may be a dedicated resource to WTRU2, as indicated by legend L. Lastly, the third colored block may be a dedicated resource to WTRU3. 820 and 825 may be configured in identical fashion which legend L again shows the same WTRUs assigned to the same small colored blocks, just like WTRU1's potential setup. 830 and 835 show that embodiment 800 may have as many DMRS and resource relationships as may be required numerically represented by the number n.

It is noted that the number of resources in the collision identification indicator is directly proportional to the number of distinguishable WTRUs.

Figure 11:
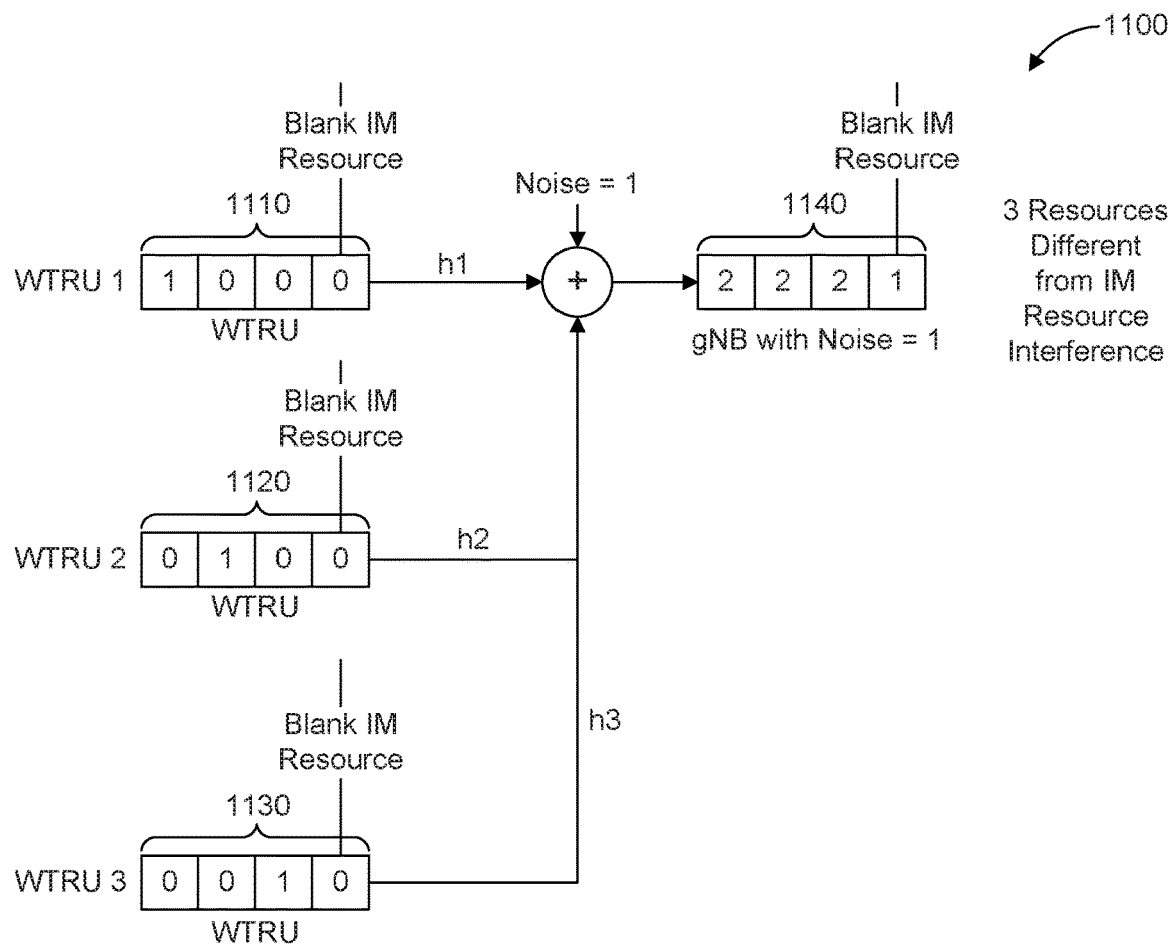
FIG. 11 shows an exemplary transmission with 3 WTRUs using a DMRS (colliding DMRS) with power control that processes a collision identification resource and identifies if there is a collision or not.

The gNB may process the collision identification resource and identify if there is a collision or not. This is illustrated in FIGS. 9-11.

In one example, the following procedure may be used. The WTRUs may be configured with or randomly select a DMRS collision resource for each DMRS.

Figure 9:
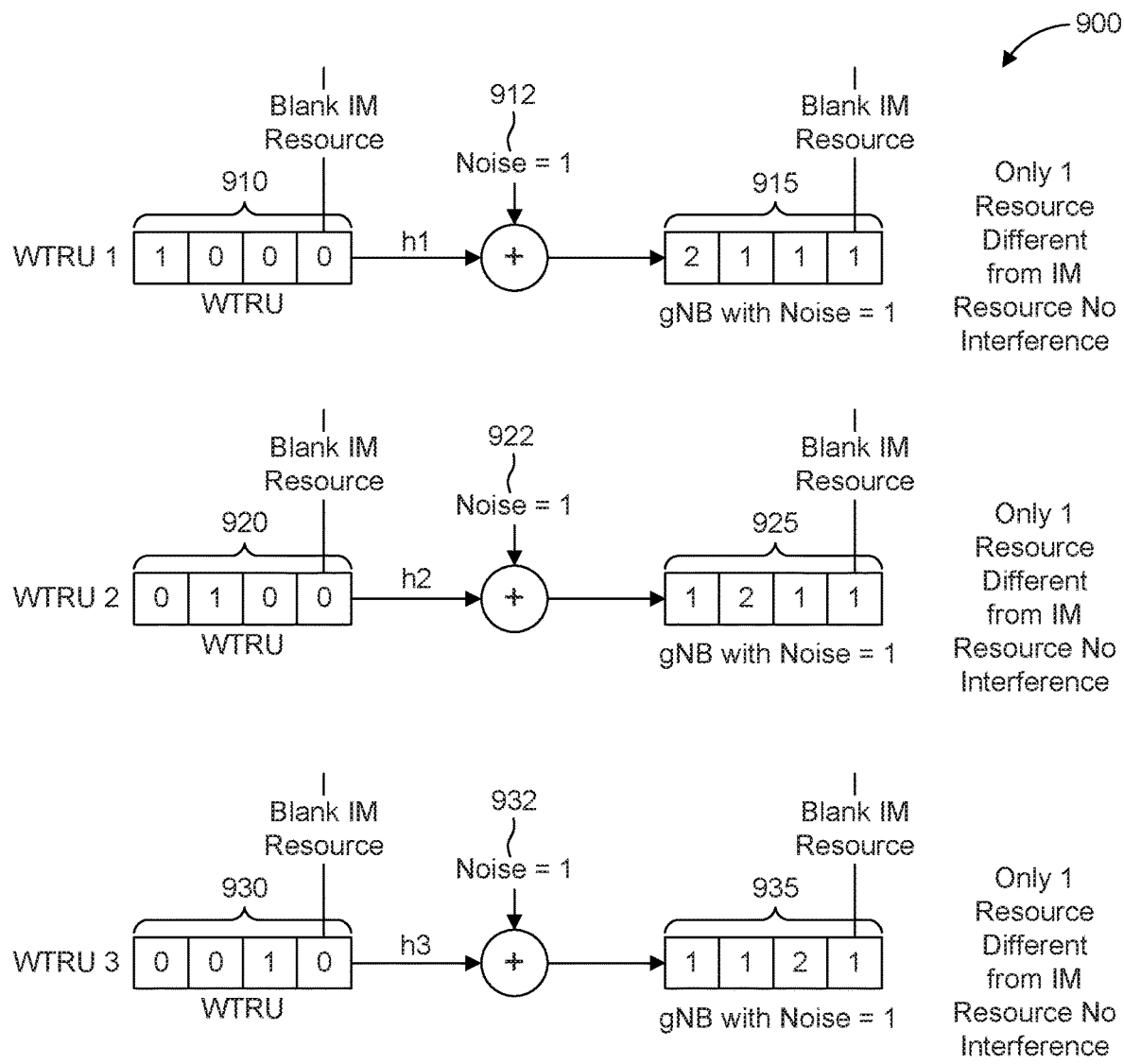
FIG. 9 shows an exemplary transmission with a single WTRU using a DMRS with power control that processes a collision identification resource and identifies if there is a collision or not.

For example, FIG. 9 shows an exemplary transmission with a single WTRU using DMRS with power control. As shown in FIG. 9, WTRU1 is configured with (or randomly selects) DMRS collision resource 1 for DMRS 1, DMRS2 and DMRS3. For any DMRS transmitted, the WTRU1 may transmit {1,0,0,0} in the DMRS collision identification indicator.

WTRU2 is configured with (or randomly selects) DMRS collision resource 2 for DMRS1, DMRS2 and DMRS3. For any DMRS transmitted, the WTRU2 may transmit {0, 1, 0, 0} in the DMRS collision identification indicator.

WTRU3 is configured with (or randomly selects) DMRS collision resource 3 for DMRS1, DMRS2 and DMRS3. For any DMRS transmitted, the WTRU3 may transmit {0, 0, 1, 0} in the DMRS collision identification indicator.

Resource 4 is a blank interference measurement resource that may be used as a reference at the gNB for measurement.

In the example, it is assumed that the noise/interference on each resource at the receiver is 1 (or some fixed value).

The gNB may then perform a collision identification procedure on the collision identification resource.

If tight power control is implemented the gNB may perform an energy measurement on the received signal. In the example, if tight power control is implemented, it is also assumed that TPC is performed to ensure that the energy received in each resource is 1.

The following may occur when a single WTRU transmits.

If only WTRU1 transmits, and the gNB performs an energy measurement on the 4 resources, the received energy will be {2, 1, 1, 1}. Only 1 resource differs from the IM resource and the gNB may be able to identify that there were no collisions.

If only WTRU2 transmits, and the gNB performs an energy measurement on the 4 resources, the received energy will be {1, 2, 1, 1}. Only 1 resource differs from the IM resource and the gNB may be able to identify that there were no collisions.

If only WTRU3 transmits, and the gNB performs an energy measurement on the 4 resources, the received energy will be {1, 1, 2, 1}. Only 1 resource differs from the IM resource and the gNB may be able to identify that there were no collisions.

As such, the gNB may be able to signal that there were no collisions to the WTRUs.

The following may occur when two WTRUs transmit.

If WTRU1 and WTRU2 transmit, and the gNB preforms and energy measurement on the 4 resources, the energy measurement at the gNB would indicate that there were 2 resources different from the IM resource (2,2,1,1) indicating that there was a collision.

The following may occur when three WTRUs transmit.

If WTRU1, WTRU2 and WTRU3 transmit, and the gNB preforms and energy measurement on the 4 resources, the energy measurement at the gNB would indicate that there were 3 resources different from the IM resource (2,2,3,1) indicating that there was a collision.

If no power control is implemented, the gNB may perform an energy measurement on a processed received signal.

The following may occur when a single WTRU transmits.

Assuming that that the channel has a gain of h=2, the gNB may be able to estimate the channel as h_est=h+noise_amplitude with $|h\_est|^2=|h|^2+noise=5$. Then, the received energy in the transmitted channel and the collision indicator may be $|h|^2+noise=5$.

If only WTRU1 transmits, and the gNB performs an energy measurement on the 4 resources, the received energy will be {5, 1, 1, 1}. By scaling all the elements by $|h|^2$, the gNB measures {1, 1/5, 1/5, 1/5}. Only 1 resource differs from the IM resource and one resource is approximately 1. The gNB may be able to identify that there were no collisions.

If only WTRU2 transmits, and the gNB performs an energy measurement on the 4 resources, the received energy will be {1, 5, 1, 1}. By scaling all the elements by $|h|^2$, the gNB measures {1/5, 1, 1/5, 1/5}. Only 1 resource differs from the IM resource and one resource is approximately 1. The gNB may be able to identify that there were no collisions.

If only WTRU3 transmits, and the gNB performs an energy measurement on the 4 resources, the received energy will be {1, 1, 5, 1}. By scaling all the elements by $|h|^2$, the gNB measures {1/5, 1/5, 1, 1/5}. Only 1 resource differs from the IM resource and the gNB may be able to identify that there were no collisions.

As such, the gNB may be able to signal that there were no collisions to the WTRUs.

The following may occur when two WTRUs transmit.

Assuming that that the channel has a gain of h1=2 and h2=3. The gNB may be able to estimate the channel as h1+h2=5. Then, the received energy in the transmitted channel may be $|h1+h2|^2+noise=26$ while the received energy in the indicator may be $|h1|^2+noise=5$ and $|h2|^2+noise=10$.

If WTRU1 and WTRU2 transmit, and the gNB performs an energy measurement on the 4 resources, the energy measurement at the gNB would indicate the following {5, 10, 1, 1}. By scaling all the elements by $|h|^2$, the gNB measures {5/26, 10/26, 1/26, 1/26}. As none is equal to 1, the gNB is able to identify a collision. By identifying only WTRU3 as equal to the noise resource, the gNB is able to signal that the first and second collided, but the third DMRS did not collide. The gNB is able to identify that the gNB may be able to estimate the total energy at 5+10+1=15 which is greater than the expected >3*1. The gNB identifies a collision.

The following may occur when three WTRUs transmit.

Assuming that that the channel has a gain of h1=2 and h2=3 and h3=1. The gNB may be able to estimate the channel as h1+h2=6. Then, the received energy in the transmitted channel may be $|h1+h2+h3|^2+noise=37$ while the received energy in the indicator may be $|h1|^2+noise=5$, $|h2|^2+noise=10$ and $|h1|^2+noise=2$.

If WTRU1, WTRU2, and WTRU3 transmit, and the gNB performs an energy measurement on the 4 resources, the energy measurement at the gNB would indicate the following {5, 10, 2, 1}. By scaling all the elements by |h|2, the gNB measures {5/26, 10/26, 2/26, 1/26}. As none is equal to 1, the gNB is able to identify a collision. By identifying all three are different from the noise resource, the gNB is able to identify collisions. The gNB identifies a collision. As such, the difference in energy received at the gNB on the different resources compared with the IM resource may serve as an indication of collision between WTRU transmissions.

FIG. 10, through embodiment 1000, shows an example transmission with 2 WTRUs using a DMRS (colliding DMRS) with power control. 1010 shows that WTRU1 may use a DMRS transmitting {1, 0,0,0} to a gNB 1040. Also, 1020 shows that WTRU2 may use a DMRS transmitting {0,1,0,0} to the gNB 1040. As shown in 1040, after WTRU1 and WTRU2 transmit, the gNB may have a setup of {2,2, 1,1}. This shows that there are two resources different from the interference management resource.

FIG. 11 shows an example transmission with 3 WTRUs using a DMRS (colliding DMRS) with power control represented by embodiment 1100. 1110 shows that WTRU1 may use a DMRS transmitting {1,0,0,0} to a gNB 1140. Also, 1120 shows that WTRU2 may use a DMRS transmitting {0,1,0,0} to the gNB 1140. Lastly, 1130 shows that WTRU3 may use a DMRS transmitting {0,0,1,0} to the gNB 1140. As shown in 1140, after WTRU1, WTRU2 and WTRU3 transmit, the gNB may have a setup of {2,2,2,1}. This shows that there are three resources different from the interference management resource.

Figure 12:
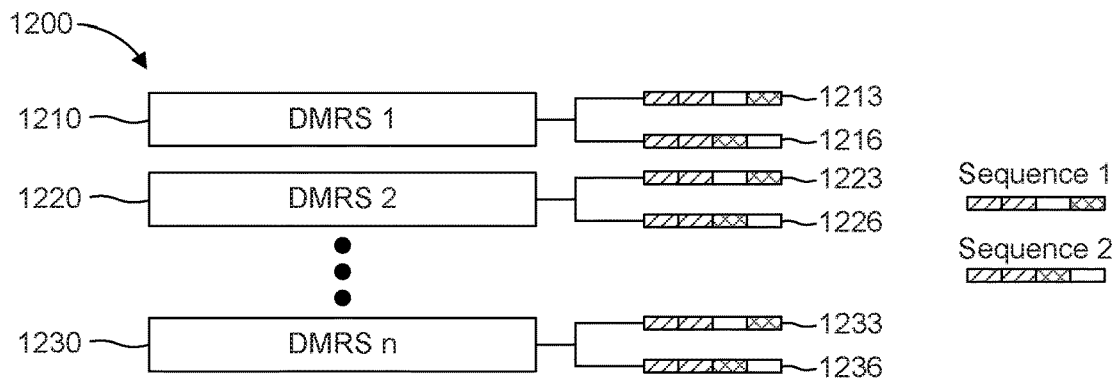
FIG. 12 shows a DMRS resources and associated collision indication resources.

In a first sequence-based method, a sequence or set of sequences with multiple transmission detection property may be transmitted. Each DMRS is allocated a dedicated collision identification indicator resource. Each WTRU is allocated the same resource in the collision identification indicator resource for the DMRS it sends. The WTRU may be assigned to one of more of a fixed set of collision identification sequences. The gNB uses these sequences to determine if there are multiple WTRUs colliding for a specific DMRS. This is illustrated in FIG. 12. Note that the number of resources in the collision identification indicator is fixed.

As shown in FIG. 12, DMRS resources can be associated with collision indication resources through embodiment 1200. 1210 represents DMRS1 which may be associated with two separately distinct sequences. 1213 represents sequence 1, the first sequence with which DMRS1 may be associated. 1216 represents sequence 2, the second sequence with which DMRS1 may be associated. Sequence 1 1213 and sequence 2 1216 have different sequences. 1220 shows that the setup in DMRS2, for a sequence based method, may be identical to DMRS1 in that DMRS2 may also be associated with sequence 1 and sequence 2. Lastly, 1230 shows that a particular sequence based method may support many DMRSs, the number of which may be represented by a number n.

In this method, each DMRS is linked to a sequence (or set of sequences) with the characteristic that if it is processed, for example, accumulated, it may have a different characteristic when sent by a single WTRU compared with when it is sent by multiple WTRUs.

In one example, the two sequences may be:
Sequence A={1 1 1 1 1 1 1 1}
Sequence B={1 1 1 1 −1−1−1−1}.

Each WTRU may be configured with one of sequence A or B or may randomly select sequence A or sequence B.

In a scenario with transmit power control, if either sequence A or sequence B is sent (i.e., only one WTRU), the energy in the resources use will be identical (i.e., energy in first four resources=8, and energy in second four resources=8). This is illustrated in FIG. 13.

Figure 13:
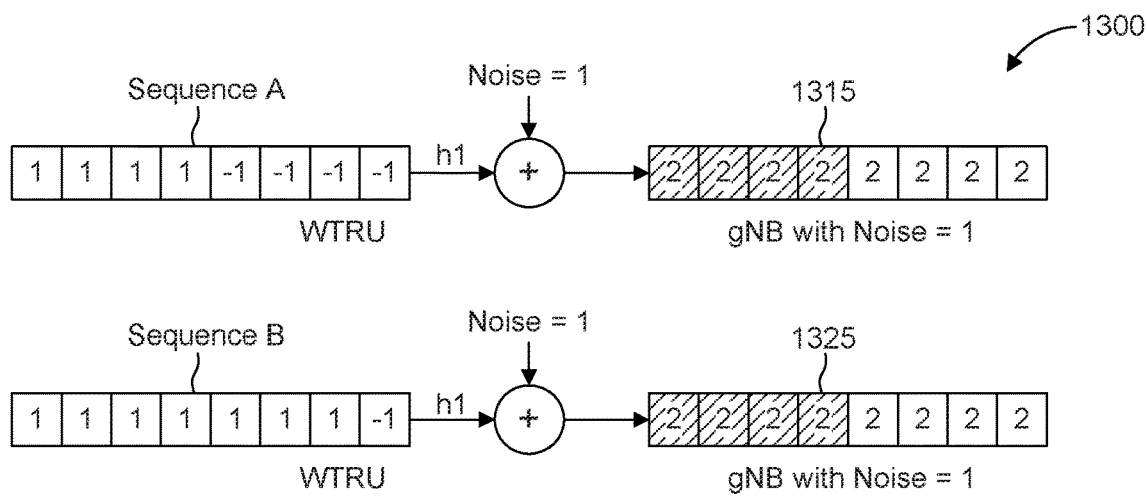
FIG. 13 shows a single WTRU with a same identification.

As shown in FIG. 13, through embodiment 1300, if Sequence A is transmitted only through one WTRU, the sequence may be {1, 1, 1, 1, −1, −1, −1, −1}, which is sent to a gNB 1315. The gNB in this instance may receive the sequence {2,2,2,2,2,2,2,2} after the transmission, as shown by 1315. Additionally, if Sequence B is transmitted through only one WTRU, the sequence may be {1, 1, 1, 1, 1, 1, 1, −1}, which is sent to the gNB 1315. The gNB in this instance may receive the sequence {2,2,2,2,2,2,2,2} after the transmission, as shown by 1325.

In a scenario with transmit power control, if two WTRUs with sequence A and sequence B are sent, the energy in the resources use will be identical (i.e., energy in first four resources=12, and energy in second four resources=4). This is illustrated in FIG. 14.

Figure 14:
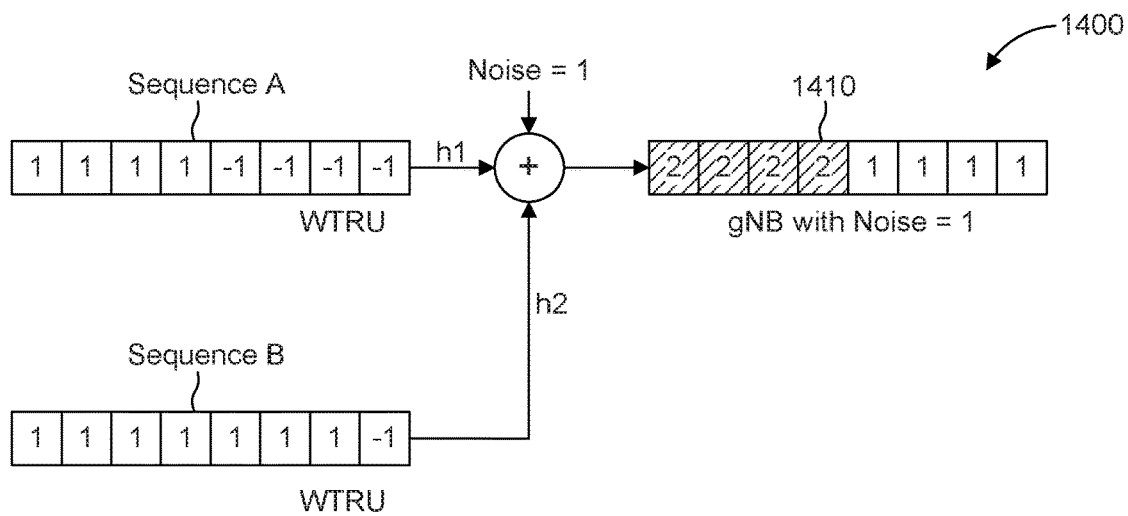
FIG. 14 shows two WTRUs with different identification sequences.

As shown in FIG. 14, through embodiment 1400, if Sequence A and Sequence B are sent through two WTRUs. Sequence A may send {1, 1, 1, 1, −1, −1, −1, −1} to a gNB 1410. Sequence B may send {1, 1, 1, 1, 1, 1, 1, −1} to the gNB at the same time as Sequence A. The gNB in this instance may receive the sequence {3,3,3,3,1,1,1,1} after both Sequence A and B are sent, as shown by 1410.

This scheme may also be used in a scenario without transmit power control. In this case, the received signal is scaled by the estimate channel. A large difference between the two halves of the sequence at the receiver may indicate that there are multiple WTRUs using the same DMRS.

In a second sequence-based method, a unique sequence may be transmitted for each WTRU. Each DMRS is linked to multiple sequences that may be uniquely identified to a specific WTRU. Each WTRU is either assigned or randomly selects the identifier. The gNB identifies collisions based on if it is able to identify multiple sequences with a single DMRS. This method may be used with or without power control and the resource is large enough such that the sequence may be uniquely identified. The amount of resource needed may depend on the separability of the sequence (e.g., a pn or ZC sequence).

Figure 15:
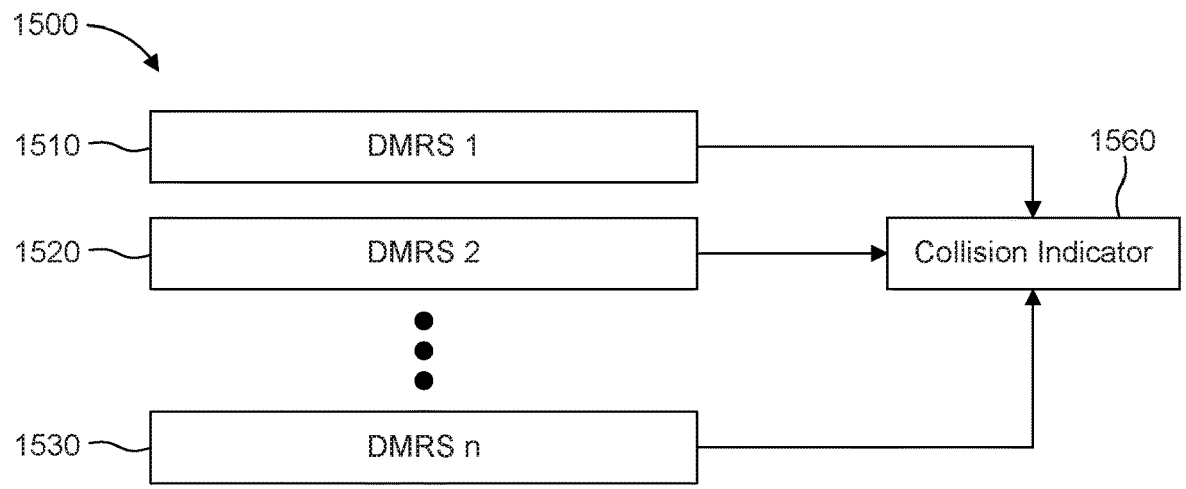
FIG. 15 shows a common DMRS collision indicator.

In an embodiment, the collision identification indicator may be sent in a common collision identification indicator resource. For example, FIG. 15 shows that DMRS1 1510 and common collision indicator 1560, DMRS2 1520 to DMRSn 1530 . . . . It should be noted that the DMRS may be sent with different indicators from each WTRU, but the resource assigned for the transmission may be the same. For example the assigned resource may be a PUCCH that is multiplexed between UEs.

In an embodiment, one or more scheduling requests (SRs) may be used to assist DMRS transmission. SR-based DMRS transmission may be used. SR may be used for DMRS transmission for NOMA. Different SRs may be used to indicate the different DMRS subsets. For example, two SRs may be used. SR #1 may be used to indicate the DMRS subset #A. SR #2 may be used to indicate the DMRS subset #B.

Different SRs may be associated with different DMRS subsets so that by sending SR, gNB may be able to learn which DMRS subset that WTRU may randomly select its DMRS from, and thus transmit the selected DMRS accordingly. More than two SRs may be used.

SR #k may be associated with the DMRS subset #k where k=1, 2, 3, . . . , K. K is a design parameter which depends on how the DMRS pool is partitioned and how many DMRS subsets are available after partitioning.

Figure 16:
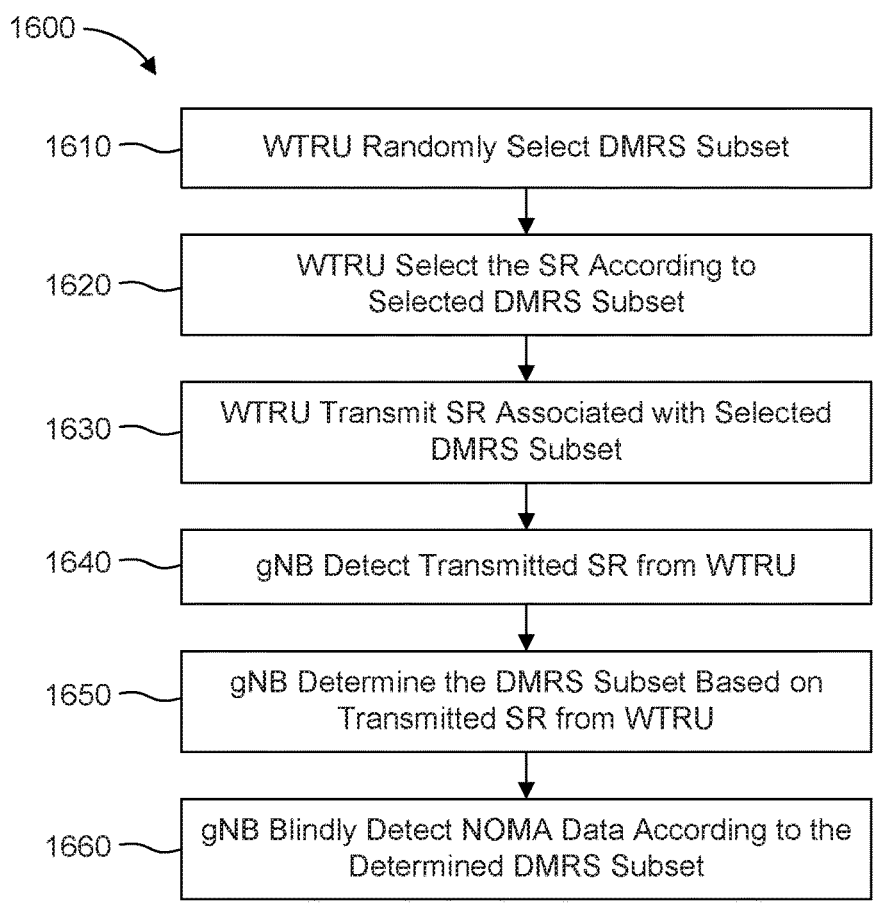
FIG. 16 shows a DMRS transmission for NOMA complexity reduction.

The WTRU and gNB procedures associated transmitting DMRS using one or more SRs is shown in FIG. 16. In FIG. 16, process 1600 begins when a WTRU randomly selects the DMRS subset 6120. Next, the WTRU may select the SR according to the selected DMRS subset, 1620. Next, the WTRU may transmit the selected SR accordingly, 1630. After that, a gNB may detect the transmitted SR from the WTRU, 1640. Following that, the gNB may determine the DMRS subset based on the transmitted SR, 1650. Lastly, the gNB may blindly detect data (e.g., PUCCH) according to the determined DMRS subset accordingly, 1660.

Figure 17:
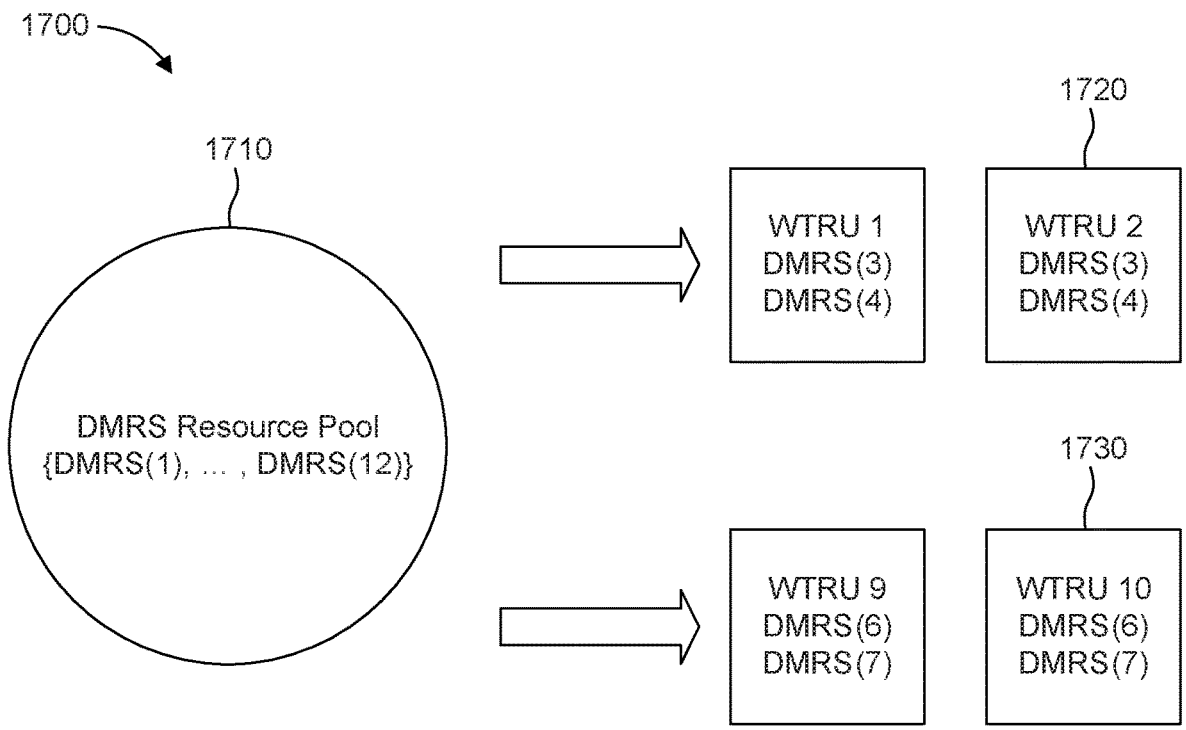
FIG. 17 shows a diagram of a MA user detection by resource grouping.

When a NOMA receiver detects a DMRS, it may need to blindly search over all users to determine the identity of the transmitter, causing excessive use of computation resources. In an embodiment where a DMRS resource pool is partitioned to several subsets of DMRS resources, a detected activity of a group may be used to narrow down the blind search to only a partition of WTRUs which have been assigned the same DMRS resource. FIG. 17 shows multiple access (MA) user detection by resource grouping. In example embodiment 1700, resource pool 1710 may include 12 DMRS resources, ranging from DMRS(1)-DMRS(12). For example, in FIG. 17, WTRU1 and WTRU2 are assigned a subset from the resource pool 1710 made up of DMRS(3) and DMRS4 while WTRU9 and WTRU10 are assigned a subset of resource pool 1710 made up of DMRS(6) and DMRS(7). When WTRU1 has a packet to transmit, it may randomly select either DMRS(3) or DMRS(4) to transmit. When the receiver detects activity on the REs belonging to DMRS3, the receiver may assume either WTRU1 or WTRU2 transmitted whereas without resource partitioning the receiver may assume either one of the four WTRUs may be transmitting. The blind search at the receiver may be reduced by restricting the allowable DMRS resources per WTRU.

When more than one WTRU attempts to transmit using the same DMRS at the same time, a collision could occur for DMRS.

In an embodiment, a resource pool of M DMRSs may be configured for all WTRUs configured in NOMA mode. The configured DMRSs may be a collection of both orthogonal and non-orthogonal DMRSs. The defined pool may be further configured to several subsets. Each subset may be defined based on use-case, service type, payload size, associated beam, WTRU density, and the like, or their combination thereof.

A DMRS may be defined based on a set of parameters. In defining the DMRS pools, the parameters may be used in a hierarchical manner to define different subsets of DMRSs. For example, a ZC-based DMRS is characterized based on its root index and cyclic shift. As such, each subset may be defined based on a root index, where in each subset different DMRSs can be defined based on a different cyclic shift.

Figure 18:
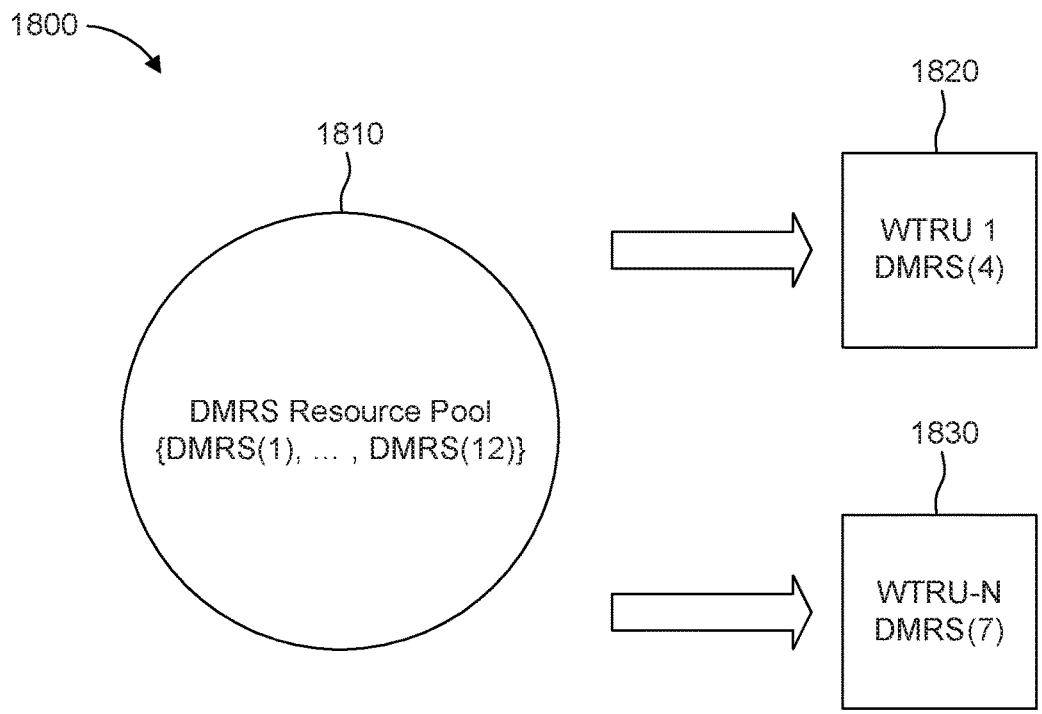
FIG. 18 shows a diagram of a DMRS resource selection by UEs from a resource pool.

When a WTRU attempts to transmit a packet, it may randomly select one DMRS resource out of the DMRSs defined in the configured pool. FIG. 18, through embodiment 1800, shows DMRS resource selection by WTRUs from a resource pool 1810. For example, in FIG. 18, a set of N WTRUs {WTRU1, . . . , WTRU-N} may be preconfigured with a pool of twelve possible DMRS sequences {DMRS(1), . . . , DMRS(12)} as shown in resource pool 1810. As such, for example when WTRU1 has a packet to transmit, it may randomly select resource DMRS(4) for its transmission as shown in block 1820. Depending on other WTRUs selection, there may or may not be a collision. For example, if WTRU N selects any DMRS except DMRS(4) for its transmission, there will not be any collision. This is shown through block 1830 where WTRU N utilizes DMRS(7) for its transmission which is different from DMRS(4).

In an embodiment, where WTRUs may employ inter-WTRU communications, a WTRU may broadcast its selection of a DMRS, so that other WTRUs may consider the information to avoid collision. The selection may be declared in an implicit or an explicit manner. For example, a WTRU may transmit an information element containing the DMRS index to explicitly declare the use of a DMRS. Alternatively, a WTRU may broadcast an index representing the DMRS pool to indicate the use of one of the DMRSs of the pool. Upon reception of such broadcast, a WTRU may use a different DMRS. Alternatively, a WTRU may trigger a timer to inhibit the use of the DMRS for a specific configured period.

Figure 19:
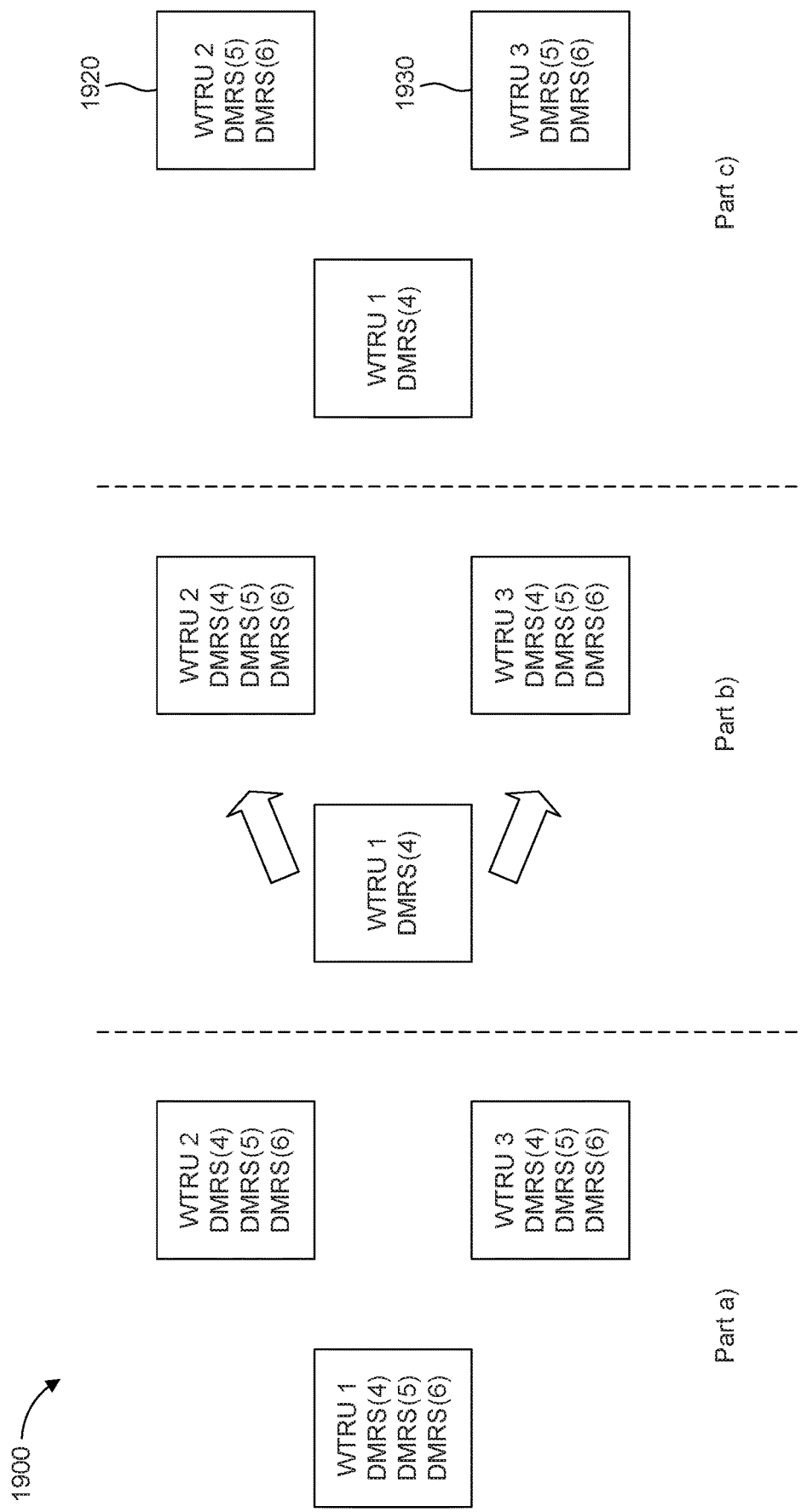
FIG. 19 shows a diagram of an inter WTRU NR DMRS pool selection.

FIG. 19 shows inter-WTRU DMRS pool selection through embodiment 1900. For example, in FIG. 19, WTRU1, WTRU2 and WTRU3 are initially preconfigured with a DMRS resource pool made up of 3 resources shown in part a). In part b), WTRU1 chooses one resource from the pool, DMRS(4), and broadcasts to other WTRUs its selection. In this part, a WTRU may include a timer in its broadcast message to let other WTRUs know how long it will use this resource. In part c), WTRU2 and WTRU3 may avoid the resource that WTRU1 selected as shown in block 1920 and 1930. Alternatively, WTRU2 and WTRU3 may use the same resource as WTRU1 but part b) may trigger the link adaptation such that WTRU2 and WTRU3 may adjust their data transmissions to better protect against multiuser interference.

The described embodiments may be used for the NR licensed spectrum, the NR-unlicensed spectrum, and V2X.

A DMRS may be characterized by its base sequence parameters as well as time/frequency resources that it is mapped on. In a NOMA system with random DMRS selection, WTRU transmissions may collide if more than one WTRU selects a same DMRS for its transmission. Upon an unsuccessful transmission, a WTRU may attempt to retransmit the packet. For the retransmission, a WTRU may use a same or different DMRS definition.

In an embodiment, following a failed transmission, a timer may be triggered to prevent the WTRU from choosing the same DMRS resource for its retransmission. The duration of the timer may be determined dynamically based on a DCI, traffic type, and/or an RRC configuration. Alternatively, the timer duration may be defined based on a functional RNTI based on WTRU mode or state of operation. In an embodiment, the timer duration may be selected randomly. The selected value may be from a predefined range.

In an embodiment, for a WTRU configured in NOMA mode, a sequence describing DMRS availability may be considered to reduce the likelihood of collision. The DMRS availability sequence may be defined in the form of a set of indices per WTRU where each index may point directly or indirectly to a specific DMRS for selection. The sequence may define a pattern of access to DMRSs for each WTRU such that not more than an X number of WTRUs attempt to select any DMRS simultaneously. The sequence may be configured directly to a WTRU, or a WTRU may determine its access pattern based on some other parameters.

In a NOMA system, a WTRU may use sequence-based DMRS. A sequence-based DMRS spans the entire band allocated for NOMA transmission.

In an embodiment, a WTRU may use different attributes and features of a sequence-based DMRS to define the DMRS pool. For example, parameters related to type, characterization, definition, initialization and mapping pattern of a sequence-based signal can be used to constitute the pool. Examples of such sequences are Gold, Kazami and ZC sequences that their attributes and features can be adjusted per requirement.

In an embodiment, one or more of the sequence-based DMRSs may be sparse. A pool of sequence-based DMRSs may be composed of both orthogonal and non-orthogonal sequences. A WTRU may determine the type of the sequence, (i.e., orthogonal or non-orthogonal based on the following criteria: service type; pathloss; payload size; and mobility. For example, in the case of a cell-edge WTRU, a WTRU may decide based on its downlink pathloss measurement to use a non-orthogonal sequence.

Figure 20:
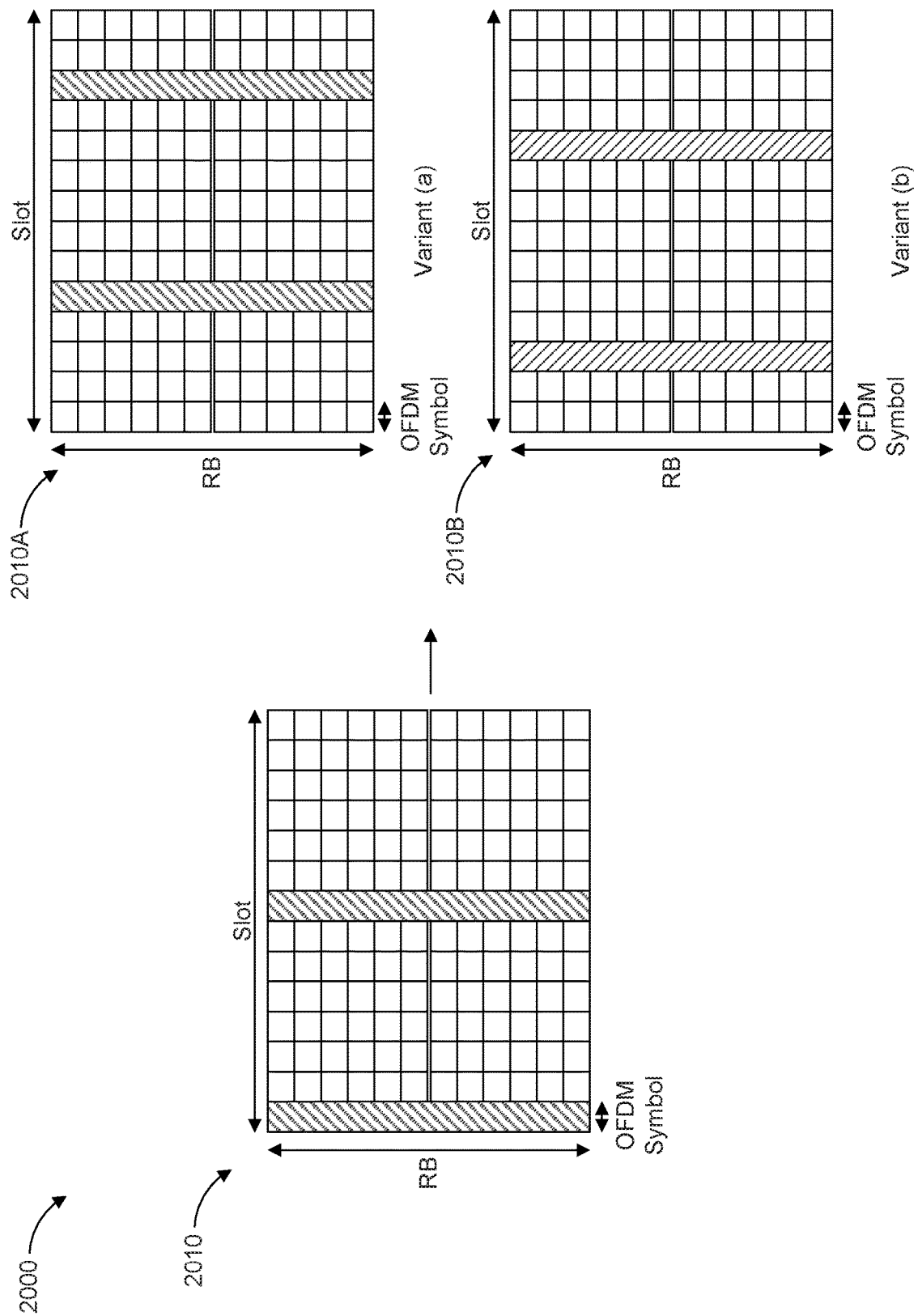
FIG. 20 shows a diagram of different patterns of a sequence-based DMRS.

As shown in FIG. 20, assuming the original reference signal pattern as shown in the left side of FIG. 20 represented as grid 2010, a WTRU may use different versions of the shifted pattern of the original reference signal design to increase the effective number of ports for transmission. For example, grids 2010*a* and 2010*b*, show two different versions of a shifted pattern than the pattern represented by grid 2010. This may enable the WTRU to increase the effective number or ports for transmission by incorporating the utilization of the patterns in 2010*a* and 2010*b*. Also, a WTRU may use different variations of a mapping pattern of a reference signal as an implicit indicator of MAS.

Although the features and elements above are described referencing embodiments and in particular combinations, each feature or element can be used alone without the other features and elements of the disclosed embodiments or in various combinations with or without other features and elements described herein.

Although the embodiments described herein consider LTE, LTE-A, NR or 5G specific protocols, it is understood that the embodiments described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless/transmit receive unit (WTRU) comprising:
 a receiver configured to receive configuration information that includes multiple SRs and associated demodulation reference signal (DMRS) subsets;
 a processor configured to randomly select a DMRS subset and select a SR configuration according to the randomly selected DMRS subset based on the received configuration information;
 a transmitter configured to transmit an SR associated with the selected DMRS subset;
 the processor further configured to select a DMRS from the selected DMRS subset;
 the processor further configured to autonomously determine a transmission type, wherein the transmission type is either grant-based or grant-free; and
 the transmitter further configured to transmit the selected DMRS with a data transmission.

2. The WTRU of claim 1 wherein each SR associated with DMRS subsets is distinguished by time and frequency resources.

3. The WTRU of claim 1 wherein each SR associated with DMRS subsets is distinguished by a sequence index value.

4. The WTRU of claim 1 wherein each SR associated with DMRS subsets is distinguished by a PUCCH index value.

5. A method of performing a data transmission, the method comprising:
 receiving configuration information that includes multiple SRs and associated demodulation reference signal (DMRS) subsets;
 randomly selecting a DMRS subset and selecting a SR configuration according to the randomly selected DMRS subset based on the received configuration information;
 autonomously determining a transmission type, wherein the transmission type is either grant-based or grant-free;
 transmitting an SR associated with the selected DMRS subset;
 selecting a DMRS from the selected DMRS subset; and
 transmitting the selected DMRS with a data transmission.

6. The method of claim 5 wherein each SR associated with DMRS subsets is distinguished by time and frequency resources.

7. The method of claim 5 wherein each SR associated with DMRS subsets is distinguished by a sequence index value.

8. The method of claim 5 wherein each SR associated with DMRS subsets is distinguished by a PUCCH index value.

* * * * *